(12) United States Patent
Bodin et al.

(10) Patent No.: US 7,853,673 B2
(45) Date of Patent: *Dec. 14, 2010

(54) CLIENT DEVICE CONFIGURATION WITH HOOKS

(75) Inventors: William K. Bodin, Austin, TX (US); Michael J. Burkhart, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 321 days.

This patent is subject to a terminal disclaimer.

(21) Appl. No.: 11/848,797

(22) Filed: Aug. 31, 2007

(65) Prior Publication Data

US 2007/0299944 A1    Dec. 27, 2007

Related U.S. Application Data

(63) Continuation of application No. 10/361,198, filed on Feb. 6, 2003, now Pat. No. 7,398,305.

(51) Int. Cl.
G06F 15/177    (2006.01)
(52) U.S. Cl. ............... 709/220; 709/217; 709/221; 709/219; 709/228
(58) Field of Classification Search ............... 709/220, 709/221, 222, 203, 217, 219, 226, 228, 223, 709/225, 229
See application file for complete search history.

(56) References Cited

U.S. PATENT DOCUMENTS

| 5,428,748 A | 6/1995 | Davidson et al. |
| 5,826,000 A | 10/1998 | Hamilton |
| 5,852,722 A | 12/1998 | Hamilton |
| 5,870,610 A | 2/1999 | Beyda |
| 6,012,088 A * | 1/2000 | Li et al. .................. 709/219 |
| 6,128,729 A | 10/2000 | Kimball et al. |
| 6,263,387 B1 | 7/2001 | Chrabaszcz |
| 6,286,038 B1 | 9/2001 | Reichmeyer et al. |
| 6,301,012 B1 | 10/2001 | White et al. |
| 6,314,459 B1 | 11/2001 | Freeman |
| 6,336,152 B1 | 1/2002 | Richman et al. |
| 6,496,858 B1 | 12/2002 | Frailong et al. |
| 7,398,305 B2 * | 7/2008 | Bodin et al. ............. 709/222 |
| 2001/0025311 A1 * | 9/2001 | Arai et al. ............... 709/225 |

(Continued)

FOREIGN PATENT DOCUMENTS

| KR | UPAP 2001-3851 | 5/2001 |
| KR | UPAP 1997-7650 | 2/2007 |

OTHER PUBLICATIONS

Crayford; '"Fast Ethernet" Gets Plug-And-Play'; IEEE; 1995; pp. 354-359.

(Continued)

*Primary Examiner*—Barbara N Burgess
(74) *Attorney, Agent, or Firm*—Edward J. Lenart; John Flynn; Biggers & Ohanian, LLP

(57) ABSTRACT

Configuring a client device including associating a hook in a configuration bundle with customized programming, downloading the configuration bundle for a client device to a services gateway, and executing the configuration bundle on the services gateway, including calling the hook.

24 Claims, 10 Drawing Sheets

U.S. PATENT DOCUMENTS

| | | |
|---|---|---|
| 2002/0026504 A1 | 2/2002 | Lo |
| 2002/0035621 A1 | 3/2002 | Zintel et al. |
| 2002/0069257 A1* | 6/2002 | Rigori et al. ................ 709/217 |
| 2002/0078367 A1 | 6/2002 | Lang et al. |
| 2002/0108002 A1 | 8/2002 | Gifford et al. |
| 2003/0191823 A1* | 10/2003 | Bansal et al. ............... 709/220 |
| 2003/0217357 A1 | 11/2003 | Perry |
| 2006/0168160 A1* | 7/2006 | Pratt ......................... 709/220 |

OTHER PUBLICATIONS

Velayos; 'Requirements For Network Services In BRAIN Project'.

Mcauley; 'Self-Configuring Networks'; IEEE; 2000; pp. 315-319.

IBM Technical Disclosure Bulletin; 'Automatic Configuration of a Personal Computer System'; Sep. 1989; vol. 32, No. 4B; pp. 112-115.

'Cisco Long-Reach Ethernet Solution'; Cisco Product Catalog; Sep. 2002.

Haberman; 'Home Networking With IPv6'; Oct. 19, 2000.

* cited by examiner

CLIENT DEVICE CONFIGURATION WITH HOOKS

CROSS-REFERENCE TO RELATED APPLICATION

This application is a continuation application of and claims priority from U.S. patent application Ser. No. 10/361,198, filed on Feb. 6, 2003 now U.S. Pat. No. 7,398,305.

BACKGROUND OF THE INVENTION

1. Field of the Invention

The field of the invention is data processing, or, more specifically, methods, systems, and products for configuring client devices.

2. Description of Related Art

Often when a networked client device is purchased and installed onto a network, such as a home network, the client device must be configured to operate properly. When disparate client devices using different protocols are networked together configuring these client devices often requires configuration parameters specific to the user, the network on which the client device will operate, and the client device. Current configuration techniques are often tedious and require extensive user involvement. In fact, in some complicated environments, configuration requires a truck roll with a technical installer. Many conventional configuration techniques require the user to access complicated text instructions from a home computer and wade through large amounts of technical data in order to complete the configuration process. Therefore, there is a need for an improved method of configuring a client device.

SUMMARY OF THE INVENTION

Exemplary embodiments of the invention include methods for configuring a client device. Exemplary embodiments include associating a hook in a configuration bundle with customized programming. Such embodiments include downloading the configuration bundle for a client device to a services gateway, and executing the configuration bundle on the services gateway, including calling the associated hook.

In exemplary embodiments of the invention, associating a hook in a configuration bundle with customized programming includes receiving a description of the hook from a manufacturer. In such embodiments, associating a hook in a configuration bundle with customized programming includes integrating the customized programming with the configuration bundle through the hook in dependence upon the description. Typical embodiments include detecting a client device and requesting a configuration bundle for the client device.

Exemplary embodiments of the invention include receiving, at a vendor, the configuration bundle for a client device. Such embodiments include receiving, at a vendor, user-provided configuration parameters for the client device. Typical embodiments include associating the user-provided configuration parameters with the configuration bundle.

Exemplary embodiments of the invention include receiving, at a configuration services provider, a configuration bundle for a client device. Such embodiments include receiving, at a configuration services provider, user-provided configuration parameters for the client device. Typical embodiments include associating the user-provided configuration parameters with the configuration bundle. In exemplary embodiments, downloading a configuration bundle for a client device to a services gateway includes downloading a generic configuration bundle to a services gateway. In such embodiments, executing the configuration bundle includes executing the generic configuration bundle in which executing the generic configuration bundle includes reading a configuration prompt from a client device, providing the configuration prompt to a user, receiving configuration parameters from a user, and writing the configuration parameters to the client device.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
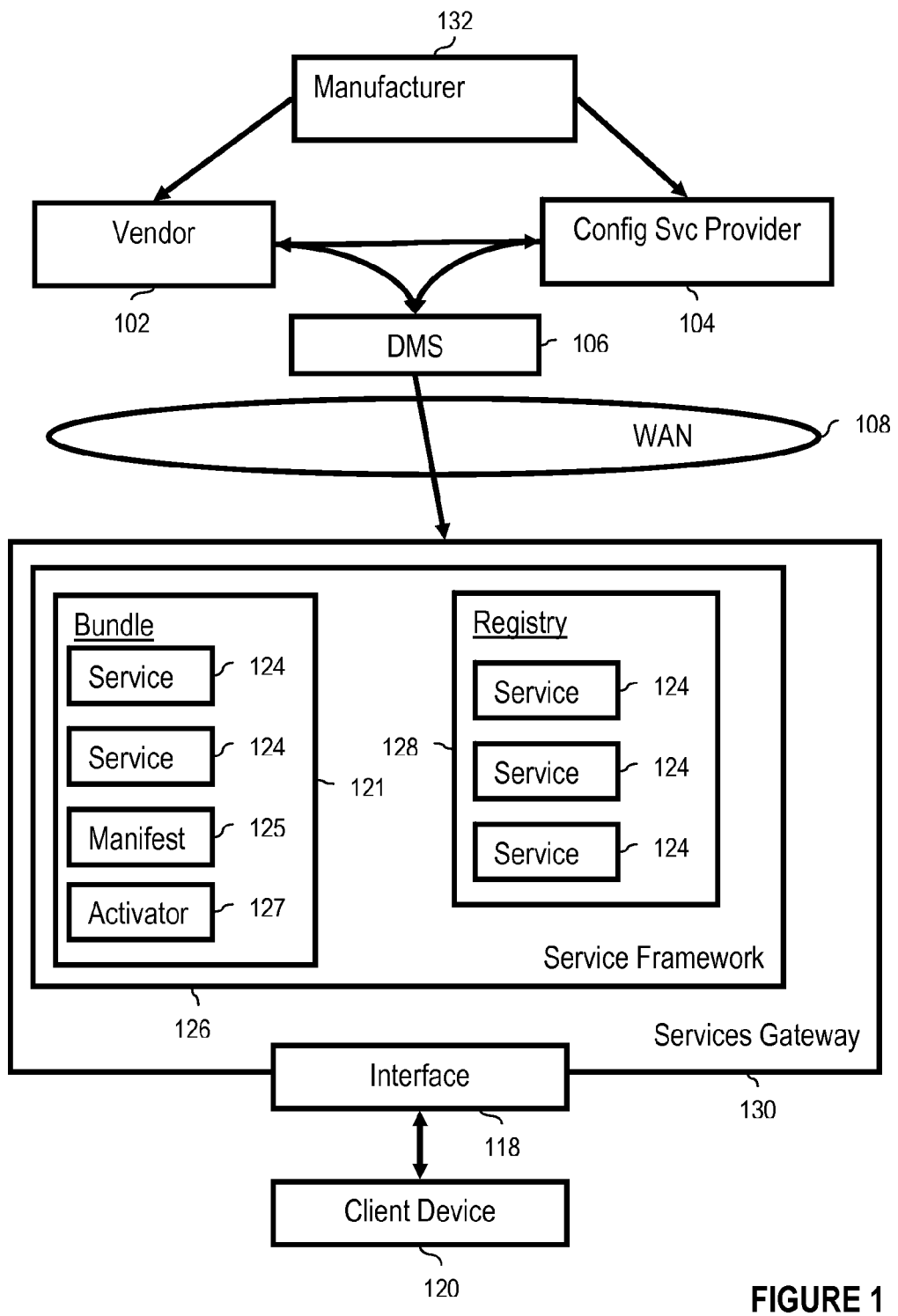
FIG. 1 is a block diagram illustrating information handling architecture and various entities useful in implementing methods of configuring a client device in accordance with methods of the present invention.

The present invention is described to a large extent in this specification in terms of methods for configuring a client device. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

"Field"—In this specification, the terms "field" and "data element," unless the context indicates otherwise, generally are used as synonyms, referring to individual elements of digital data. Aggregates of data elements are referred to as "records" or "data structures." Aggregates of records are referred to as "tables" or "files." Aggregates of files or tables are referred to as "databases." Complex data structures that include member methods, functions, or software routines as well as data elements are referred to as "classes." Instances of classes are referred to as "objects" or "class objects."

"802.11" refers to a family of specifications developed by the IEEE for wireless LAN technology. 802.11 specifies an over-the-air interface between a wireless client and a base station or between two wireless clients.

"API" is an abbreviation for "application programming interface." An API is a set of routines, protocols, and tools for building software applications.

"Bluetooth" refers to an industrial specification for a short-range radio technology for RF couplings among client devices and between client devices and resources on a LAN or other network. An administrative body called the Bluetooth Special Interest Group tests and qualifies devices as Bluetooth compliant. The Bluetooth specification consists of a 'Foundation Core,' which provides design specifications, and a 'Foundation Profile,' which provides interoperability guidelines.

"Browser" means a web browser, a communications application for locating and displaying web pages. Browsers typically comprise a markup language interpreter, web page display routines, and an HTTP communications client. Typical browsers today can display text, graphics, audio and video. Browsers are operative in web-enabled devices, including wireless web-enabled devices. Browsers in wireless web-enabled devices often are downsized browsers called "microbrowsers." Microbrowsers in wireless web-enabled devices often support markup languages other than HTML, including for example, WML, the Wireless Markup Language.

"Coupled for data communications" means any form of data communications, wireless, 802.11b, Bluetooth, infrared, radio, internet protocols, HTTP protocols, email protocols, networked, direct connections, dedicated phone lines, dial-ups, serial connections with RS-232 (EIA232) or Universal Serial Buses, hard-wired parallel port connections, network connections according to the Power Line Protocol, and other forms of connection for data communications as will occur to those of skill in the art. Couplings for data communications include networked couplings for data communications. Examples of networks useful with various embodiments of the invention include cable networks, intranets, extranets, internets, local area networks, wide area networks, and other network arrangements as will occur to those of skill in the art. The use of any networked coupling among television channels, cable channels, video providers, telecommunications sources, and the like, is well within the scope of the present invention.

"Driver" means a program that controls a device. A device (printer, disk drive, keyboard) typically has a driver. A driver acts as translator between the device and software programs that use the device. Each device has a set of specialized commands that its driver knows. Software programs generally access devices by using generic commands. The driver, therefore, accepts generic commands from a program and then translates them into specialized commands for the device.

"HAVi" stands for 'Home Audio Video interoperability,' the name of a vendor-neutral audio-video standard particularly for home entertainment environments. HAVi allows different home entertainment and communication devices (such as VCRs, televisions, stereos, security systems, and video monitors) to be networked together and controlled from one primary device, such as a PC or television. Using IEEE 1394, the 'Firewire' specification, as the interconnection medium, HAVi allows products from different vendors to comply with one another based on defined connection and communication protocols and APIs. Services provided by HAVi's distributed application system include an addressing scheme and message transfer, lookup for discovering resources, posting and receiving local or remote events, and streaming and controlling isochronous data streams.

"Homeplug" stands for The HomePlug Powerline Alliance. Homeplug is a not-for-profit corporation formed to provide a forum for the creation of open specifications for high speed home powerline networking products and services. The homeplug specification is designed for delivery of Internet communications and multimedia to homes through the home power outlet using powerline networking standards.

In this specification, a "hook" in a configuration bundle is a call from within a configuration bundle to one or more executable software programs that are not associated with the call when the call is written into the source code for the bundle. The executable programming may not be associated with the call when the call was written for many reasons. For example, the executable programming may be created by an entity that did not manufacture the configuration bundle or the executable programming is written after the configuration bundle is created.

"ID" abbreviates "identification," meaning 'identification code' or identification field. It is a style of reference in this disclosure to refer to user identification codes as "user IDs." By convention in this disclosure, the field name "UserID" is used to store a user ID.

"IEEE 1394" is an external bus standard that supports data transfer rates of up to 400 Mbps (400 million bits per second). Products supporting the 1394 standard go under different names, depending on the company. Apple, which originally developed IEEE 1394, uses the trademarked name "FireWire." Other companies use other names, such as i.link and Lynx, to describe their 1394 products.

A single 1394 port can be used to connect up 63 external devices. In addition to high speed, 1394 also supports isochronous data—delivering data at a guaranteed rate. This makes it ideal for devices that need to transfer high levels of data in real-time, such as video.

"The Internet" is a global network connecting millions of computers utilizing the 'internet protocol' or 'IP' as the network layer of their networking protocol stacks. The Internet is decentralized by design. Each computer on the Internet is independent. Operators for each computer on the Internet can choose which Internet services to use and which local services to make available to the global Internet community. There are a variety of ways to access the Internet. Many online services, such as America Online, offer access to some Internet services. It is also possible to gain access through a commercial Internet Service Provider (ISP). An "internet" (uncapialized) is any network using IP as the network layer in its network protocol stack.

'IP' refers to the 'internet protocol,' a network-layer networking protocol for computer data communications.

"IP address" means an identifier for a computer or device on an IP network. Networks using the IP protocol route messages based on the IP address of the destination. The format of an IP address is a 32-bit numeric address written as four numbers separated by periods. Each number can be zero to 255. An example of an IP address is 1.160.10.240.

"ISP" means "Internet Service Provider," a company that provides access to the Internet. For a monthly fee, an ISP provides a user identification code (often called a 'username'), a password, and an access phone number or, for wide band services, an internet protocol address, through which to access the Internet. Equipped with proper couplings for data communications, such as a modem or cable modem, users and companies can then log on to the Internet, browse the World Wide Web, and access other Internet related services such as USENET and e-mail. In servings companies, ISPs also provide a direct connection from the company's networks to the Internet.

"JAR" is an abbreviation for 'Java archives' JAR is a file format used to bundle components used by a Java applet. JAR files simplify downloading applets, because many components (.class files, images, sounds, etc.) can be packaged into a single file. JAR also supports data compression, which further decreases download times. By convention, JAR files end with a .jar extension.

"JES" stands for Java Embedded Server. JES is a commercial implementation of OSGi that provides a framework for development, deployment, and installation of applications and services to embedded devices.

"JNI" is an abbreviation for Java Native Interface. JNI is a standard programming interface that allows Java code running in a Java Virtual Machine to operate with applications and libraries written in other languages such as C, C++, or assembly language.

"LAN" is an abbreviation for "local area network." A LAN is a computer network that spans a relatively small area. Many LANs are confined to a single building or group of buildings. However, one LAN can be connected to other LANs over any distance via telephone lines and radio waves. A system of LANs connected in this way is called a wide-area network (WAN). The Internet is an example of a WAN.

"OSGI" refers to the Open Services Gateway Initiative, an industry organization developing specifications for services gateways, including specifications for delivery of service bundles, software middleware providing compliant data communications and services through services gateways. The Open Services Gateway specification is a java based application layer framework that gives service providers, network operator device makers, and appliance manufacturer's vendor neutral application and device layer APIs and functions.

"Server" in this specification refers to a computer or device comprising automated computing machinery on a network that manages resources and requests for access to resources. A "web server," or "HTTP server," in particular is a server that communicates with browsers by means of HTTP in order to manage and make available to networked computers documents in markup languages like HTML, digital objects, and other resources. A "DMS server," in particular is a server that communicates with services gateways to provide service bundles to the services gateways.

"SMF" stands for "Service Management Framework™" available from IBM®. SMF is a standards-based architecture that is designed to be compliant with specifications developed by the cross-industry Open Services Gateway Initiative (OSGi). SMF is a commercial implementation of OSGi for management of network delivered applications on services gateways.

'TCP' refers to the 'Transmission Control Protocol,' a transport-layer networking protocol for networked computer data communications. TCP provides a so-called 'reliable' communications protocol in which a message is broken into packets which are communicated to the message's destination and reassembled into the message completely and in correct sequence. TCP is so often used with IP as its underlying network protocol layer that the two are often spoken of together as the TCP/IP protocol suite.

"TCP/IP" means the Transmission Control Protocol (TCP) and the Internet Protocol (IP) operating together. TCP/IP is a packet switching protocol suite. TCP establishes a virtual connection between a data source and a data destination. IP specifies that data will be sent from the source to the destination in packets and IP specifies the addressing scheme of the source and the destination. TCP monitors the delivery of the data and the order in which the packets are delivered.

"USB" is an abbreviation for "universal serial bus." USB is an external bus standard that supports data transfer rates of 12 Mbps. A single USB port can be used to connect up to 127 peripheral devices, such as mice, modems, and keyboards. USB also supports Plug-and-Play installation and hot plugging.

"WAP" refers to the Wireless Application Protocol, a protocol for use with handheld wireless devices. Examples of wireless devices useful with WAP include mobile phones, pagers, two-way radios, and hand-held computers. WAP supports many wireless networks, and WAP is supported by many operating systems. Operating systems specifically engineered for handheld devices include PalmOS, EPOC, Windows CE, FLEXOS, OS/9, and JavaOS. WAP devices that use displays and access the Internet run "microbrowsers." The micrbrowsers use small file sizes that can accommodate the low memory constraints of handheld devices and the low-bandwidth constraints of wireless networks.

"World Wide Web," or more simply "the web," refers to a system of internet protocol ("IP") servers that support specially formatted documents, documents formatted in markup languages such as HTML (HyperText Markup Language), XML (eXtensible Markup Language), WML (Wireless Markup Language), or HDML (Handheld Device Markup Language). The term "Web" is used in this specification also to refer to any server or connected group or interconnected groups of servers that implement a hyperlinking protocol, such as HTTP (HyperText Transfer Protocol) or WAP (Wireless Access Protocol), in support of URIs and documents in markup languages, regardless of whether such servers or groups of servers are coupled to the World Wide Web as such.

DETAILED DESCRIPTION

FIG. 1 is a block diagram illustrating an exemplary information handling architecture and various entities useful in implementing methods of configuring a client device in accordance with various embodiments of the present invention. The exemplary architecture of FIG. 1 includes a client device (120) to be configured. A client device (120) can be any configurable device, although in many typical embodiments of the present invention, client devices (120) are devices capable of being networked on a LAN, such as a home network, or any other network as will occur to those of skill in the art. Examples of client devices (120) to be configured include printers, a dishwasher, a DVD player, a coffeepot, or any other device that will occur to those of skill in the art.

In the exemplary architecture of FIG. 1, a client device (120) is coupled for data communication with a services gateway (130). The services gateway (130) is coupled for data communication WAN (108). The services gateway (130) provides access for the client device (120), and any LAN on which the client device (102) is operating, to a WAN such as the Internet.

A services gateway (130) is in some exemplary architectures an OSGi compatible services gateway (130). While exemplary embodiments of methods for configuring a client device are described in this specification using OSGi, many other applications and frameworks, will work to implement the methods of configuring a client device according to the present invention, and are therefore, also well within the scope of the present invention. Even further commercial implementations of OSGi such as JES and SMF are also useful in implementing methods of configuring client devices according to embodiments of the present invention.

OSGi Stands for 'Open Services Gateway Initiative.' The OSGi specification is a Java based application layer framework that provides vendor neutral application and device layer APIs and functions for various devices using arbitrary communication protocols operating in networks in homes, cars, and other environments. OSGi works with a variety of networking technologies like Ethernet, Bluetooth, the 'Home, Audio and Video Interoperability standard' (HAVi), IEEE 1394, Universal Serial Bus (USB), WAP, and powerline communication systems, including the Home Powerline Alliance standard known as HomePlug. The OSGi specification is available for free download from the OSGi website at www.osgi.org.

The services gateway of FIG. 1 includes a service framework (126). In many example embodiments the service framework is an OSGi service framework (126). An OSGi service framework (126) is written in Java and therefore, typically runs on a Java Virtual Machine (JVM). In OSGi, the service framework (126) of FIG. 1 is a hosting platform for running 'services' (124). The term 'service' or 'services' in this disclosure, depending on context, generally refers to OSGi-compliant services.

Services (124) are the main building blocks for creating applications in the OSGi. A service (124) is a group of Java classes and interfaces that implement a certain feature. The OSGi specification provides a number of standard services. For example, OSGi provides a standard HTTP service that creates a web server that can respond to requests from HTTP clients.

OSGi also provides a set of standard services called the Device Access Specification. The Device Access Specification ("DAS") provides services to identify a device connected to the services gateway, search for a driver for that device, and install the driver for the device.

Services (124) in OSGi are packaged with other files, images, and resources that the services (124) need for execution in a 'bundle,' such as the bundle (121) of FIG. 1. A bundle (121) is a Java archive (JAR) file including one or more services (124), an activator class (127), and a manifest file (125). An activator class (127) is a Java class that the service framework (126) uses to start and stop a bundle. A manifest file (125) is a standard text file that describes the contents of the bundle (121).

The services framework (126) in OSGi also includes a service registry (128). The service registry (128) includes the service's name and an instance of a class that implements the service for each bundle (121) installed on the framework (126) and registered with the service registry (128). A bundle (121) may request services that are not included in the bundle (121), but are registered on the framework service registry (128). To find a service, a bundle (121) performs a query on the framework's service registry (128).

The exemplary entities of FIG. 1 also include a Device Management Server ('DMS') (106) coupled for data communications with the services gateway (130) though a WAN (108) such as the Internet, the World Wide Web, or any WAN. The DMS is a server specifically designed to provide, retrieve, or otherwise deploy bundles to the services gateway (130). In many typical examples, a DMS agent provides protocols for receiving requests for bundles from a gateway, authenticating the gateway, retrieving a requested bundle, and providing the requested bundle to the services gateway.

The exemplary entities of FIG. 1 include a Configuration Services Provider ('CSP') (104). A CSP (104) is a service provider that obtains configuration bundles for client devices and provides them to users. A user is a subscriber or customer of a CSP. A CSP receives configuration parameters from users. When a user or vendor notifies a CSP of the purchase of a client device that needs to be configured, the CSP (104) provides an associated configuration bundle for the client device. An associated configuration bundle is a configuration bundle for the client device that has within the bundle configuration parameters necessary for the configuration on the user's services gateway (130). The CSP of FIG. 1 downloads the configuration bundle to the user's services gateway through a DMS. The associated configuration bundle is executed on the services gateway to configure the client device.

The exemplary entities of FIG. 1 include a vendor (102). The vendor (102) sells or otherwise provides client devices (120) to the user. In examples of methods of configuring a client device, the vendor (102) also sells or otherwise provides to a user configuration bundles for the client device. In some example embodiments of the present invention, the vendor obtains the configuration bundles form a manufacturer of configuration bundles (132).

The exemplary entities of FIG. 1 also include a manufacturer (132). The manufacturer (132) of FIG. 1 is a manufacturer of configuration bundles for use with methods of configuring a client device (120) according to the present invention. The manufacturer (132) of configuration bundles for the client device is in some instances the manufacturer of the client device (120) itself. However, the manufacturer (132) of a configuration bundle may be a third-party manufacturer of configuration bundles who did not manufacture the client device.

Figure 2:
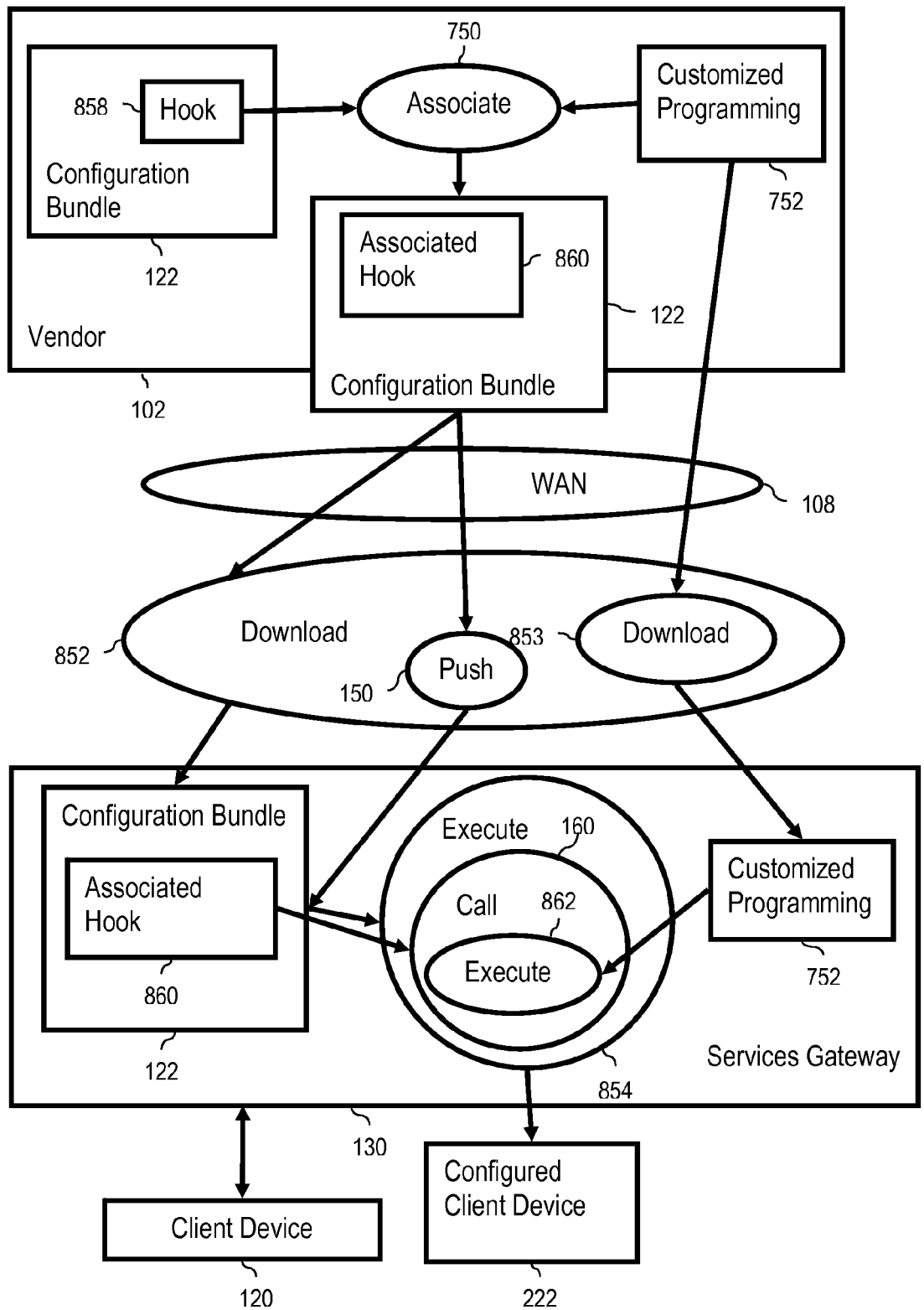
FIG. 2 is a data flow diagram illustrating an exemplary method of configuring a client device according to the present invention.

FIG. 2 is a data flow diagram illustrating a method of configuring a client device in accordance with the present invention. The method of FIG. 2 includes associating (750) a hook (858) in a configuration bundle (122) with customized programming (752). A configuration bundle (122) includes services, and other resources for configuring the client device (120) in accordance with methods of the present invention. In some examples of configuring a client device according to methods of the present invention, the configuration bundle (122) is an OSGi bundle including services for configuring the client device. The OSGi configuration bundle is executed on an OSGi services gateway to configure the client device.

In some examples of the method of FIG. 2, the configuration bundle (122) is a configuration bundle specifically designed to configure a particular client device. Because in many examples of the method of FIG. 2 the configuration bundles (122) are designed to configure a specific client device (120), various configuration bundles (122) have various designs according to the client device the configuration bundle is designed to configure, the network on which the client device (120) will operate, the services gateway to which the configuration bundle (122) will be deployed and executed, or any other factor that will occur to those of skill in the art.

By contrast, in other examples of the method of FIG. 2, a device specific configuration bundle cannot be downloaded to the user's services gateway, because a device specific configuration bundle is either unavailable or does not exist. In cases where a device specific configuration bundle is unavailable or does not exist, the configuration bundle (122) is a generic configuration bundle. The generic configuration bundle includes services and other resources to facilitate the user's entry of configuration parameters to configure the client device on the user' services gateway.

The configuration bundle (122) includes a hook (858). A hook (858) is a call from within a configuration bundle to one or more executable software programs that are not associated with the call when the call is written into the source code for the bundle. The executable programming may not be associated with the call when the call is written for many reasons. For example, the executable programming may be created by a different entity from the manufacturer of the configuration bundle or the executable programming is written after the configuration bundle is created. In many typical embodiments, the hook (858) is a call to a predefined interface or interface methods and a predefined class. A manufacturer of the configuration bundle provides calls to the predefined interfaces or interface member methods and predefined classes to allow the manufacturer or other entities to integrate customized programming with the configuration bundle such that the customized programming is executed when the hook is called.

Customized programming (752) includes any programming executable by calling the hook. In many typical embodiments of the method of FIG. 2, the customized programming (752) includes OSGi services that are executed on a services gateway. In some examples, the customized programming includes an OSGi bundle or set of OSGi bundles containing services that carry out customized functions intended by the entity associating the customized programming with the hook. In various alternative embodiments, customized programming can be provided by various entities for various purposes such as, for example, advertisement, improved services for configuring client devices, monitoring the user's use of the client device, facilitating further communication with user or for any other purpose that will occur to those of skill in the art.

Associating (750) customized programming (752) with a hook (858) includes integrating customized programming with the configuration bundle such that when the hook is called the customized programming is executed. Associating (750) customized programming (752) with a hook produces an associated hook. In this specification, an 'associated hook' is a hook for which customized programming is available to the configuration bundle for execution when the associated hook is called. If no customized programming is associated with the hook, then during execution of the configuration bundle, calling the hook does nothing. That is, there is no requirement that the hooks in the configuration bundle be associated with executable customized programming. If no customized programming is associated with the hook, the hook is called, no customized programming is executed, and configuration of the client device proceeds without interruption.

In the method of FIG. 2, associating (750) customized programming (752) with a hook (858) in a configuration bundle is carried out by a vendor (102). A vendor (102) associates customized programming with the hook to customize configuration based on services offered by the vendor, to advertise for the vendor, or provide any other service that will occur to those of skill in the art. In alternative embodiments of the method of FIG. 2, associating (750) customized programming (752) with a hook (858) in configuration bundle is carried out by a manufacturer, CSP, or any other entity that will occur to those of skill in the art.

The method of configuring a client device according to FIG. 2 includes downloading (852) a configuration bundle (122) for a client device (120) to a services gateway (130). In the method of FIG. 2, downloading (852) the configuration bundle (122) for the client device (120) to a services gateway (130) includes downloading a configuration bundle (122) from a CSP (104). In alternative embodiments of the method of FIG. 2, downloading (852) the configuration bundle (122) for the client device (120) to a services gateway (130) includes downloading a configuration bundle (122) from a manufacturer, a vendor, a DMS, or any other entity that will occur to those of skill in the art.

In some examples of the method of FIG. 2 downloading the configuration bundle (122) to the services gateway (130) includes downloading a configuration bundle having the customized programming (752) stored within the configuration bundle (122). However, in other examples of the method of FIG. 2, the customized programming is not stored within the configuration bundle. In such examples, the method of FIG. 2 includes downloading (853) the customized programming (752) separately from the configuration bundle (122). In some examples of the method of FIG. 2, the customized programming includes an OSGi bundle or set of OSGI bundles that are downloaded separately from the configuration bundle. The OSGi bundles are installed on the services gateway. When the OSGi bundle is downloaded to the services gateway, the bundles register their services within the bundle on a services registry. The registered services are available to the configuration bundle and the customized programming.

In some examples of the method of FIG. 2, downloading (852) a configuration bundle (122) includes pushing (150) the configuration bundle (122) to the user's services gateway (130). 'Pushing' means that the CSP, knowing the WAN network address of a user's services gateway and being authorized to do so, originates a download of a configuration bundle (122) on the CSP's own motion, without waiting for a specific request from a user for the download. In various alternative embodiments of the method of FIG. 2, pushing (150) the configuration bundle (122) to the user's services gateway (130) is carried out by a vendor, manufacturer, DMS, or any other entity that will occur to those of skill in the art.

The method of FIG. 2 includes executing (854) the configuration bundle (122) on the services gateway (130). Executing (854) the associated configuration results in a configured client device (222). In many cases, the configuration bundle is executed when the client device is detected on the services gateway. That is, a service in the configuration bundle polls a configuration port on the services gateway and, when it detects the presence of a client device, the service is programmed to proceed with configuration at that time. Methods of detecting a client device on a configuration port of a services gateway are described in more detail below.

In other examples, executing (854) the configuration bundle (122) includes receiving an instruction from the user to execute the configuration bundle. Using a web browser installed on a computer connected to the services gateway, a user, through a series of instruction screens, instructs the services gateway to execute the configuration bundle. In many embodiments, a services gateway according to the present invention has installed directly upon it no user interface hardware, no terminal screen, no keyboard, no mouse, although such services gateways do often support HTTP interfaces to services on the gateway. In such embodiments, a user can access HTTP screens on the gateway by logging on to a browser on a personal computer or other client device that does support user interface hardware and is coupled to the gateway through a LAN and directing the browser to the services gateway's IP address on the LAN.

In the method of FIG. 2, executing (854) the configuration bundle (122) includes calling (160) the associated hook (858), thereby executing (862) the customized programming (752). In many examples of the method of FIG. 2, calling (160) the associated hook (860) includes calling predefined interfaces or interface member methods and a predefined class. If no customized programming is associated with the hook, then calling these predefined interfaces or interface member methods and predefined classes does nothing. If no customized programming is associated with the hook, the hook is called, no customized programming is executed, and configuration of the client device proceeds without interruption.

In some examples, executing (862) the customized programming (752) occurs transparently to the user. That is, the user is not involved in the configuration process and is unaware of the services deployed by calling the customized programming. Consider the following example. A vendor provides an extended warranty for the client device. Customized programming designed to register the client device with the vendor to avail the user of the vendor's extended warranty is associated with the hook. The OSGi framework provides standard services in the DAS to identify the client device by reading information from the client device such as make, model, and serial number. The OSGi framework also provides a standard HTTP service. Executing the customized programming to register a client device with the vendor includes identifying the make, model and serial number of the client device using standard services in the DAS, including the make, model, and serial number of the client device in a pre-designed warranty registration, and sending the completed pre-designed warranty registration to the vendor as an HTML document in an HTTP message. In this example, customized programming provides a service to the user that occurs without user intervention.

In other examples of the method of FIG. 2, executing (862) the customized programming (752) makes the user aware of the customized programming (752). For example, customized programming (752) provided by a vendor includes advertisements created as HTML documents. The customized programming also includes calls to the standard OSGi HTTP services in the services gateway for purposes of displaying to the user at install time the customized HTML documents. Executing (862) the customized programming (752) calls the standard OSGi HTTP service to send the included HTML documents containing advertisements for the vendor as an HTTP message to a desktop computer on a LAN connected to the services gateway. The user views the HTML document with a web browser installed on the user's desktop computer. By viewing the advertisement from the vendor, the user is made aware of the execution of the customized programming.

Figure 2A:
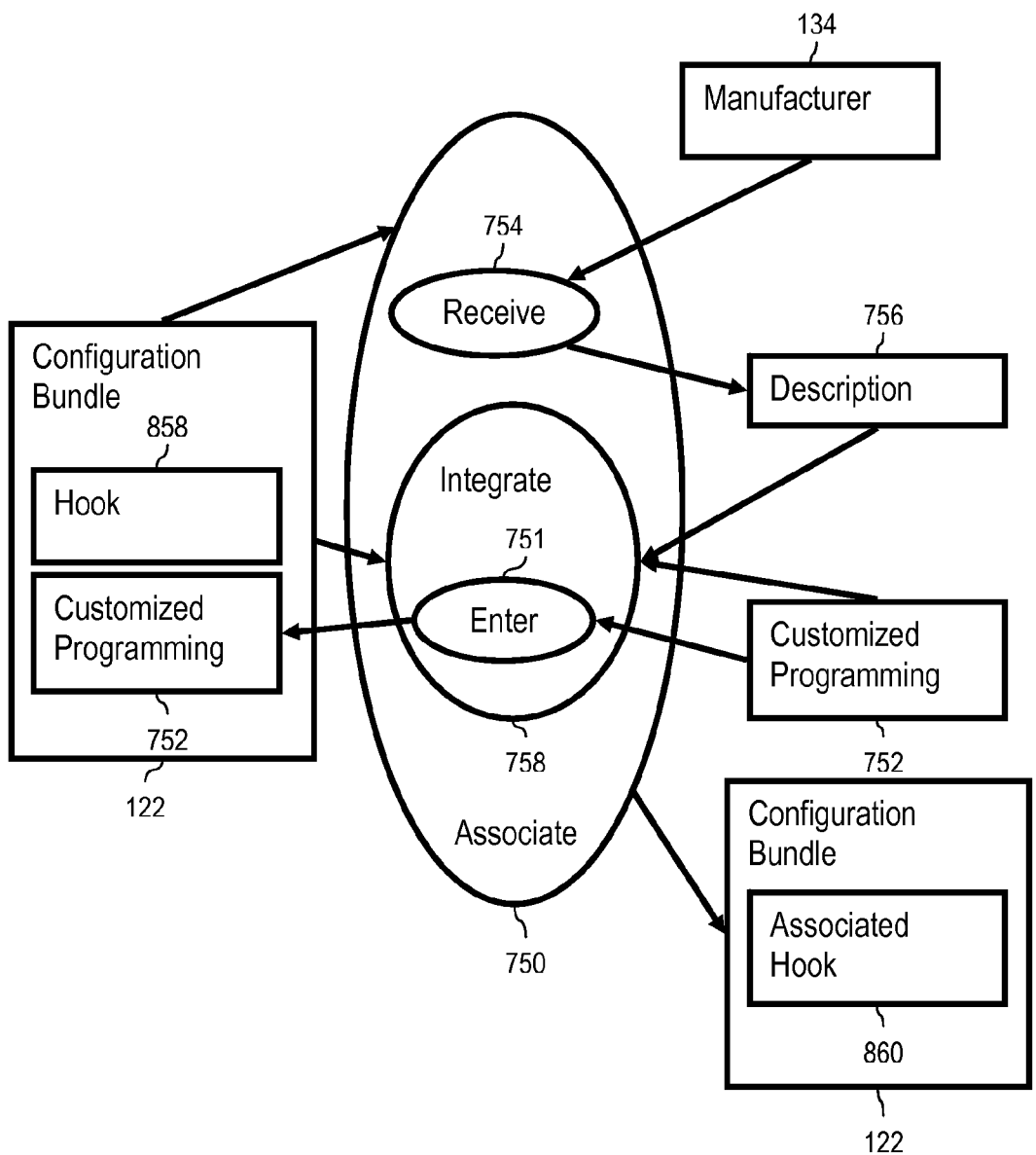
FIG. 2a is a data flow diagram of methods of associating customized programming with a hook in a configuration bundle according to the present invention.

FIG. 2a is a data flow diagram illustrating exemplary methods of associating (750) a hook (858) in a configuration bundle (122) with customized programming (752). In the method of FIG. 2a, associating (750) a hook (858) in a configuration bundle (122) with customized programming (752) includes receiving (754) a description (756) of the hook from a manufacturer (134). In some examples of the method of FIG. 2a, a description (756) of the hook includes a predefined interfaces or interface member methods and predefined class names for the hook such that customized programming (752) can be integrated with the configuration bundle through the hook (858) so that calling the associated hook executes the customized programming. In some examples of the method of FIG. 2a, the description (756) of the hook is included within a specification produced for each configuration bundle (122) manufactured by the manufacturer. Other entities interested in associating (750) customized programming (752) with the hook (858), such as a CSP, vendor, or any other entity that will occur to those of skill in the art receive the predefined interfaces or interface member methods and predefined class names for the hook and integrate customized programming with the configuration bundle. Calling the hook executes the customized programming.

In the method of FIG. 2a, associating (750) a hook (858) in a configuration bundle (122) with customized programming (752) includes integrating (758) the customized programming (752) with the configuration bundle through the hook (858) in dependence upon the description (756) of the hook provided by the manufacturer (134). In some examples of the method of FIG. 2a, integrating (758) the customized programming (752) with the configuration bundle through the hook (858) includes designing the customized programming having class names and interfaces or interface member methods for the hook that are predetermined by the manufacturer and described in the description (756) of the hook. By designing the customized programming with predefined class names and predefined interfaces or interface member methods received from the manufacturer, calling the hook executes the customized programming.

In some example of the method of FIG. 2a, associating (750) the customized programming (752) with the hook (858) includes entering (751) the customized programming into the configuration bundle. For example, a manufacturer receives customized programming from a vendor or CSP and enters the customized programming into the configuration bundle producing a single configuration bundle or set of configuration bundles available for download to the user's services gateway. In other examples of the method of FIG. 2a, a vendor, CSP or any other entity enters the customized programming into the configuration bundle.

In alternate embodiments of the method of FIG. 2a, the customized programming is not entered into the configuration bundle. In some examples of the method of FIG. 2a, the customized programming is a separate OSGi bundle or set of OSGi bundles downloadable to the user's services gateway.

When the customized programming is installed on the user's services gateway, the customized programming registers services within the customized programming with the services registry making the services available for execution by calling the hook.

In some examples, the customized programming includes OSGI compliant services and resources programmed in Java. In other examples of the method of FIG. 2a, the configuration bundle (122) is an OSGi bundle, but the customized programming (752) is written in native languages such as C, C++, assembly language, or any other language that will occur to those of ordinary skill in the art. One way integrating customized programming written in native languages with an OSGi configuration bundle through a predefined hook includes using the Java Native Interface (JNI). JNI provides Java Virtual Machine features to customized programming written in native languages through JNI functions that are called by the native code. The JNI functions called by the native code access the Java Virtual Machine. JNI also includes an 'Invocation API' that allows the Java Virtual Machine to be embedded in the customized programming written in native languages. The Java Virtual Machine that is embedded in the customized programming allows Java code of the OSGi configuration bundle to access libraries and resources in the customized programming written in native languages.

More particularly, a hook in C can be implemented as illustrated by the following pseudocode:

system(\UserHookDirectory\UserHook.exe);

which, when included in source code of a configuration bundle, will result in a call to a native executable software program named "UserHook.exe." The program UserHook.exe need not exist when the configuration bundle is created, but is added later by a CSP, vendor, or manufacturer by integrating the program with the configuration bundle and downloading a copy of the program UserHook.exe in a file system on the services gateway where the configuration bundle is to be executed in a subdirectory named "\UserHookDirectory." In some alternative examples, the program UserHook.exe is entered into the configuration bundle before the configuration bundle is downloaded to the user's services gateway. This pseudocode example includes no provision for error detection. If the program named UserHook.exe is not provided, does not exist at configuration time, or fails for any reason to execute correctly, the configuration bundle is unaware of that fact and continues execution regardless of that fact.

It is useful for explanation to consider an example in C because C is so familiar to persons of skill in the art. Because many configuration bundles according to embodiments of the present invention will be written in Java, however, it is advantageous also to consider a pseudocode example of a user hook in Java:

```
loadClass(UserHookDirectory.UserHookClass);
aUserHookObject = new UserHookClass( );
aUserHookObject.UserHookMethod( );
```

The pseudo code example above directs the local JVM to load the class UserHookClass from the directory named UserHookDirectory. The pseudo code instantiates a user hook object named aUserHookObject, and executes the public member method named UserHookMethod( ). A CSP, vendor, or other manufacturer wishing to integrate customized programming with the configuration bundle provides a class named UserHookClass including a public member method named UserHookMethod( ). The CSP, vendor, or manufactuer stores the class UserHookClass in a local subdirectory named \UserHookDirectory.

In this example, again, there is no error check, no exception thrown. If UserHookClass is absent or fails to load for any reason, a bundle containing such exemplary code simply continues execution unabated. If the 'new' call fails for any reason to instantiate aUserHookObject, a bundle containing such exemplary code simply continues execution unabated. If UserHookMethod( ) is missing from the class or fails to execute correctly for any reason, a bundle containing such exemplary code simply continues execution unabated.

Figure 3:
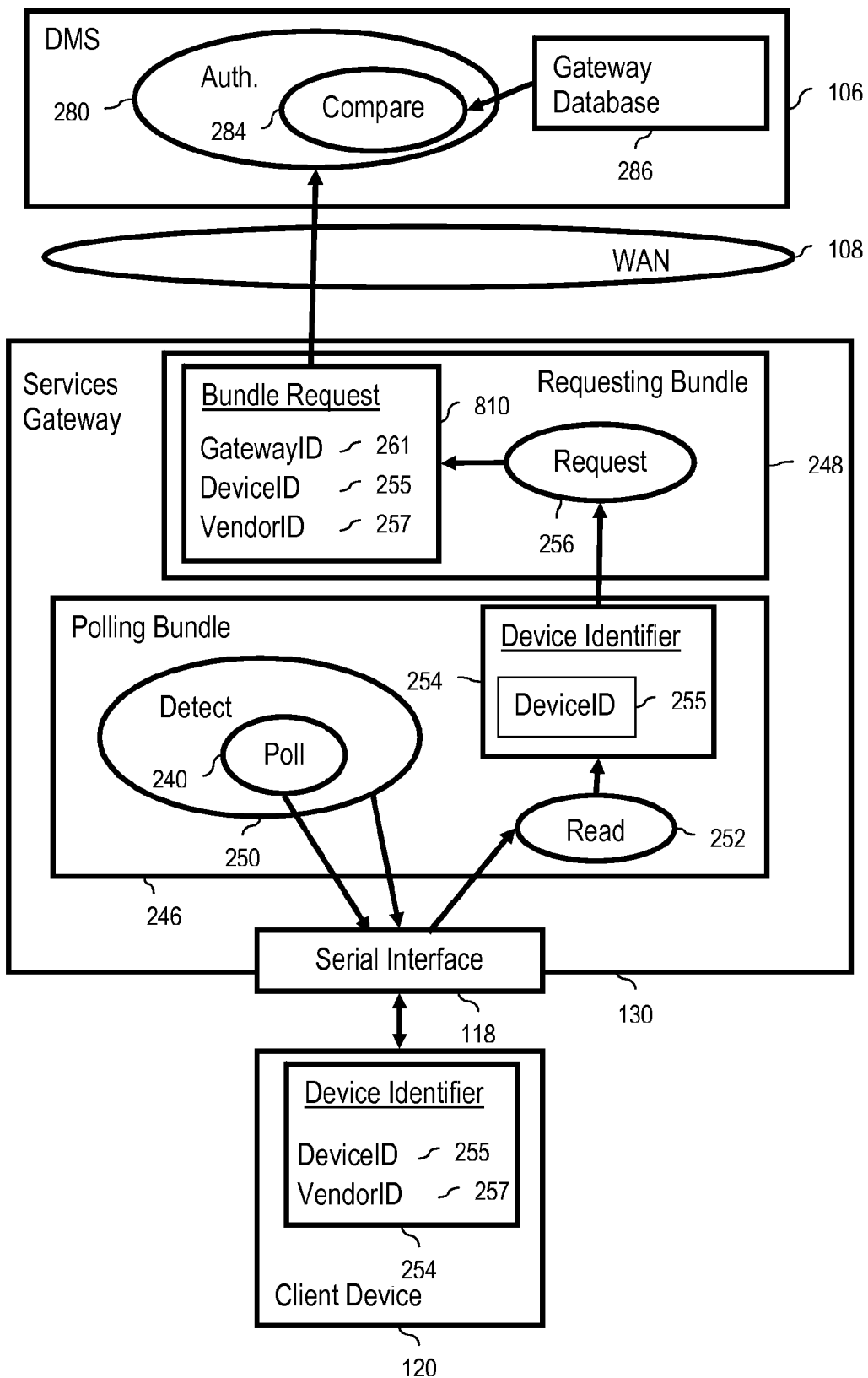
FIG. 3 is a data flow diagram illustrating methods of detecting a client device and requesting an associated configuration bundle.

FIG. 3 is a data flow diagram illustrating an exemplary method of detecting (250) a client device (120) and requesting (242) a configuration bundle (242) for the client device (120). In the method of FIG. 3, detecting a client device (120) includes polling (240) a serial interface (118) for the connection of a client device (120). Polling (240) a serial interface (118) means periodically checking the serial interface for the connection of a device.

In the method of FIG. 3, detecting (250) a client device (250) is carried out through a polling bundle (246). In some example embodiments, the polling bundle (246) is an OSGi bundle. An OSGi framework provides standard services in the DAS for checking for the connection of devices on the services gateway (130). In some examples, the polling bundle (246) includes specifically programmed polling services within the bundle. In alternative examples, the polling bundles queries a services registry on an OSGi framework operating on the services gateway to identify standard OSGi services for checking for the connection of a device on the services gateway. In the example of FIG. 3, the polling bundle (246) uses the OSGi standard services to poll (240) the serial interface (118) and detect the client device (120).

The method of FIG. 3 includes reading (252) a client device identifier (254) from the client device (120) when polling detects a client device connected to a serial interface. A client device identifier (254) is any identification that sufficiently identifies the client device such that an appropriate configuration bundle for the client device may be obtained and executed. Exemplary client device identifiers include manufacturer name, model name, serial number, or any other client device identifier as will occur to those of skill in the art.

The client device identifier may be represented in data by a record such as the client device identifier record (254) of FIG. 3. The client device identifier record (254) is stored in nonvolatile memory on the client device (120). The client device identifier record (254) includes a deviceID field (255) representing a serial number, make and model, or any other identification of the device that will occur to those of skill in the art. The device identifier record (254) of FIG. 3 also includes a vendorID field (257) identifying the vendor (102) of the client device. In some examples, a vendor may place a unique identifier in the vendorID field of the client device before selling the client device or the manufacturer many identify the vendor by vendorID before shipping the client device to the vendor.

In method of FIG. 3, a polling bundle (246) carries out reading (252) a client device identifier (254) from the client device (120). In some example embodiments, the polling bundle (246) is an OSGi bundle. An OSGi framework provides standard services in a DAS for reading device identifiers from a device connected to the services gateway (130). In some exemplary methods of detecting client devices and requesting configuration bundles, a polling bundle (246) includes specifically programmed services within the bundle to read the client device identifier. In alternative examples, the polling bundle queries a services registry on an OSGi framework operating on the services gateway to identify standard OSGi services for reading a client device identifier. In such embodiments, the polling bundle (246) then uses the OSGi standard services to read a client device identifier from the client device.

A DAS in an OSGi framework often also provides standard services to identify and install a driver for the client device. In embodiments that utilize such DAS services, when a polling bundle (246) detects a client device (120) and identifies the client device (120), the polling bundle queries the service registry on the service framework of the services gateway to identify standard services to obtain and install a driver to facilitate communication between the services gateway and the client device.

In some exemplary methods of detecting client devices and requesting configuration bundles, the configuration bundle for the client device is pushed onto the services gateway (120). In such exemplary embodiments, requesting (256) the configuration bundle includes requesting the configuration bundle stored within the services gateway. In other exemplary embodiments, where the configuration bundle is not pushed onto the services gateway (130), requesting (256) a configuration bundle includes requesting a configuration bundle from a DMS.

A request for a configuration bundle can be represented in data as a record such as, for example, the bundle request record (810) of FIG. 3. The bundle request record (810) includes a deviceID field (255) identifying the client device to be configured. The bundle request record (810) also includes a gatewayID field (261) identifying the gateway requesting the associated configuration bundle. The bundle request record (810) of FIG. 3 includes a vendorID field (257) identifying the vendor (102) of the client device (120). In some examples, the gatewayID and the DeviceID together uniquely identify a client-device-specific configuration bundle for the device. In some cases, the client-device-specific configuration bundle is associated with user-provided configuration parameters. In other examples, the bundle request record includes a userID identifying the user.

Requesting (256) a configuration bundle, in many embodiments of the present invention, is carried out by a requesting bundle, such as the requesting bundle (242) of FIG. 3. In some exemplary embodiments according to the present invention, the requesting bundle (242) is an OSGi bundle including services capable of sending a request for an associated configuration bundle to a DMS. The OSGi framework provides a standard HTTP service. In some examples, a requesting bundle (242) sends a bundle request to the DMS as a HTML document in an HTTP message. The method of FIG. 3 includes authenticating (280) the services gateway (130). Authenticating the gateway can be carried out, for example, by comparing (284) the gatewayID field (261) of the bundle request record (810) with a gateway database (286). In the method of FIG. 3, authenticating (280) the services gateway (130) is carried out by a DMS. The DMS authenticates the services gateway by comparing the services gateway identifier with a database of gateway identifiers registered with the DMS. When the services gateway is authenticated, the method of FIG. 3 includes retrieving the configuration bundle stored on the DMS. The DMS downloads the configuration bundle to the services gateway for execution.

When the services gateway is authenticated, the DMS identifies the configuration bundle for the client device stored on the DMS. The DMS identifies a configuration bundle for the client device in dependence upon the deviceID field (255) and the gatewayID field (261) of the bundle request record (810). The DMS downloads the identified configuration bundle to the services gateway for execution. Alternatively, the DMS requests the configuration bundle from a vendor identified by the vendorID field of the bundle request record (810).

Figure 4:
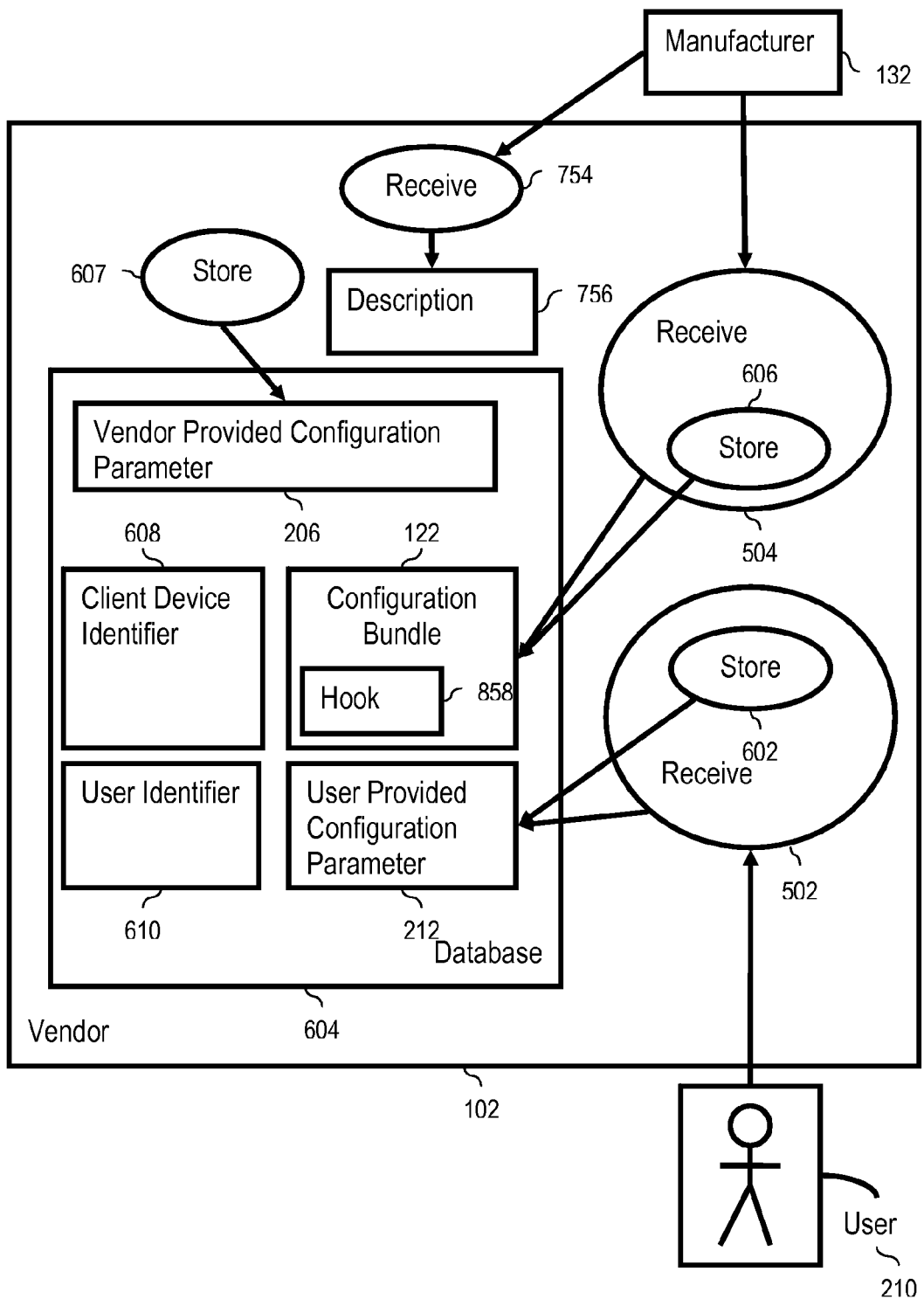
FIG. 4 is a data flow diagram illustrating an exemplary method of receiving, at a vendor, a configuration bundle and user-provided configuration parameters.

FIG. 4 is a data flow diagram illustrating a method of receiving a configuration bundle and user provided configuration parameters at a vendor. The method of FIG. 4 includes receiving (504), at the vendor (102), a configuration bundle (122) for the client device (120). In the method of FIG. 4, the configuration bundle (122) is received from a manufacturer (132). The manufacturer (132) is a manufacturer of the configuration bundle (122) for the client device (120). In many examples according to the present invention, the manufacturer (132) of the configuration bundle (122) is the manufacturer of the client device (120). However, in other examples, the manufacturer (132) of the configuration bundle may not manufacture the client device (120).

In the example of FIG. 4, the configuration bundle (122) includes services and other resources for configuring the client device (120) in accordance with methods of the present invention. In some cases, the configuration bundle (122) includes a driver for the client device (120). In some examples of configuring a client device according to methods of the present invention, the configuration bundle (122) is an OSGi bundle including services for configuring the client device. The OSGi configuration bundle is executed on an OSGi services gateway to configure the client device. Because the in many examples of the method of FIG. 4 the configuration bundle (122) is designed to configure a specific client device (120), in many examples, various configuration bundles (122) have various designs according to the client device the configuration bundle is designed to configure, the network on which the client device (120) will operate, the services gateway to which the configuration bundle (122) will be deployed and executed, or any other factor that will occur to those of skill in the art.

The configuration bundle (122) includes a hook (858). A hook (858) is a call from within a configuration bundle to one or more executable software programs that are not associated with the call when the call is written into the source code for the bundle. The executable programming may not be associated with the call when the call is written for many reasons. For example, the executable programming may be created by a different entity from the manufacturer of the configuration bundle or the executable programming is written after the configuration bundle is created. In many typical embodiments, the hook (858) is a call to a predefined interface or interface methods and a predefined class. A manufacturer of the configuration bundle provides calls to the predefined public member method and predefined class to allow the manufacturer or other entities to integrate customized programming with the configuration bundle such that the customized programming is executed when the hook is called. A manufacturer of the configuration bundle provides hooks to allow the manufacturer or other entities involved in the configuration the flexibility to associate customized programming with the hook at a later time.

In some examples of the method of FIG. 4, receiving (504), at the vendor (102), a configuration bundle (122) for the client device (120) from a manufacturer (132) includes individually downloading the configuration bundle (122) from, for example, a manufacturer's website. Alternatively, receiving (504), at the vendor (102), a configuration bundle (122) for the client device (120) from a manufacturer (132) includes receiving configuration bundles as a complete database of configuration bundles indexed, for example, by make, model, or client device serial number. In many cases, the database is stored on a compact disc, or other form of non-volatile computer memory. Receiving (504), at the vendor (102), a configuration bundle (122) for the client device (120) from a manufacturer (132) includes receiving updates to configuration bundles (122) previously received at the vendor (102).

The method of FIG. 4 includes receiving (502), at a vendor (102), user-provided configuration parameters (212) for the client device (120) from a user (210). Although a vendor is generally a business organization, a vendor (102) as depicted in FIG. 4 comprises particularly a vendor's automated computing machinery upon which is carried out processing steps in methods for configuring client devices according to embodiments of the present invention.

User provided configuration parameters (212) typically include configuration parameters known or available to the user (134) that concern the user's services gateway, network, or other configuration parameters that define the context in which the client device (120) will operate. Examples of user provided configuration parameters (212) include a user's LAN mask, a user's IP default gateway address, a user's IP address, a user's LAN name, a user's DMS name, a users link type (Ethernet, Bluetooth, 802.11), wireless network name, wireless encryption key, or any other user provided configuration parameters that will occur to those of skill in the art.

In some embodiments of the present invention, some additional configuration parameters such as a client device identifier are made known to the vendor by the purchase of the client device. That is, parameters such as serial number, make and model of the client device are available to the vendor (102) at the point of sale, and therefore, the vendor may not receive these configuration parameters from the user.

In the method of FIG. 4, receiving (502), at a vendor (102), user provided configuration parameters (212) for the client device (120) includes storing (602) the user provided configuration parameters (212) in a database (604). By storing (602) user provided configuration parameters (212) the vendor (102) provides an additional service to the user. The user provides the user provided configuration parameters (212) one time to the vendor (102). The vendor automates the configuration for a user reducing the user's involvement in configuration with each additional client device (120) the user purchases from the vendor. In this way, a user is encouraged to continue shopping with the vendor (102), because configuring client devices (102) proceeds automatically for each client device purchased after the vendor received the user provided configuration parameters (212).

In the method of FIG. 4, receiving (504), at the vendor (102), a configuration bundle (122) for the client device (120) from a manufacturer (132) includes storing (606) the configuration bundle (122) in a database (604). The database (604) of FIG. 4 is indexed according to a client device identifier (608). A vendor (102) receives (504) the configuration bundle from the manufacturer (132) and stores (606) the configuration bundles in a database (604).

In one example, a vendor (102) receives configuration bundles from many manufacturers regardless the user's purchases. The vendor (102) maintains a current database of all the configuration bundles for all the manufacturers whose products the vendor (102) sells. When the vendor (102) sells the client device, a configuration bundle (122) for the client device is available in the vendor's database (604) for purchase, or for the vendor (102) to provide as an additional customer service.

In the database (604) of FIG. 4, the configuration bundles (122) are indexed according to client device identifier (608). Examples of client device identifiers (608) include manufacturer name and model number, serial number or any other client device identifier that will occur to those of skill in the art. By indexing the database (604) by client device identifier (608) the vendor (102) can retrieve the appropriate configuration bundle for the client device when the user purchases the client device.

The method of FIG. 4 includes receiving (754), at a vendor, a description (756) of the hook. In some examples of the method of FIG. 4, a description (756) of the hook includes a predefined interfaces or interface member methods and predefined class names for the hook, such that customized programming (752) can be integrated with the configuration bundle through the hook (858) so that calling the associated hook executes the customized programming. In some examples of the method of FIG. 4, the description (756) of the hook is included within a specification produced for each configuration bundle (122) manufactured by the manufacturer. A vendor interested in associating (750) customized programming (752) with the hook (858) receives the predefined interfaces or interface member methods and predefined class names for the hook and designs customized programming to be executed when the hook is called.

Figure 5:
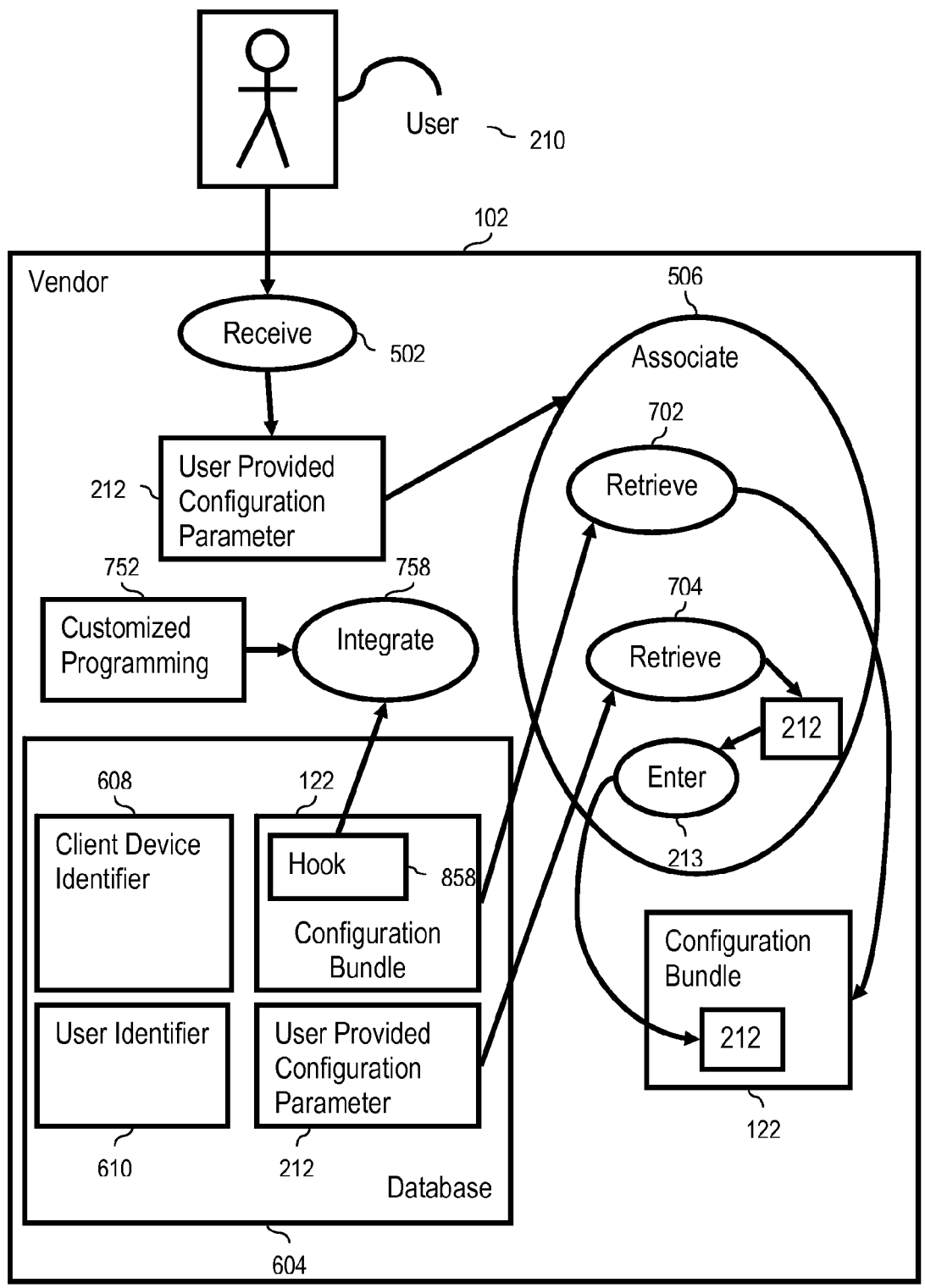
FIG. 5 is a data flow diagram illustrating an exemplary method of associating, at a vendor, a configuration bundle with user-provided configuration parameters.

FIG. 5 is a data flow diagram illustrating a method of associating (506) the user-provided configuration parameters (212) with the configuration bundle (122). Associating (506) the user provided configuration parameters (212) with the configuration bundle (122) results in an associated configuration bundle. An associated configuration bundle is a configuration bundle having the appropriate configuration parameters such that when deployed to the user's services gateway, and when executed, the associated configuration bundle configures the client device.

When the user-provided configuration parameters (212) have been associated with the configuration bundle (122), the associated configuration bundle is ready for deployment to the user's services gateway. In many cases, more than one configuration bundle are associated to create a complete set of associated configuration bundles, such that when the set of configuration bundles are deployed onto the user's services gateway and executed, the user's client device is configured.

In the method of FIG. 5, associating (506) the user-provided configuration parameters (212) with the configuration bundle (122) for the client device (120) is carried out by the vendor (102). In one example, the vendor (102) receives the user provided configuration parameters (212) at the point of sale and receives a configuration bundle (122) from a manufacturer (132). The vendor associates the user-provided configuration parameters (212) with the configuration bundle (122), thereby creating an associated configuration bundle for the user.

Consider an example of a vendor (102) operating a website. A user (210) purchases a client device (120) from the vendor (102) through the vendor's website. During the purchase, a vendor's (102) website includes a series of screens requesting user provided configuration parameters (212). Upon completion of the purchase, the vendor (102) receives (504) a configuration bundle (122) from a manufacturer (132) or retrieves a configuration bundle from a database of configuration bundles already received from the manufacturer (134). The vendor (102) associates the user provided configuration parameters with the configuration bundle (122).

In the method of FIG. 5 associating (506) the user provided configuration parameters (212) for the client device (120) with the configuration bundle (122) for the client device (120) includes retrieving (702) the configuration bundle (122) from a database (604) in dependence upon a client device identifier (608). When the vendor (102) sells the client device (120) to the user, the vendor (102) retrieves (702) the appropriate configuration bundle (122) from the vendor's database (604).

If the user (210) is a previous customer of the vendor (102), the vendor may have user-provided configuration parameters (212) for the user stored in the vendor's database. In the method of FIG. 5, associating (506) the user provided configuration parameters (212) for the client device (120) with the configuration bundle (122) for the client device (120) includes retrieving (704) user provided configuration parameters (212) from a database (604) in dependence upon a user identifier (610) and entering (213) the user provided configuration parameters into the configuration bundle (122).

In the method of FIG. 5, associating (506) user provided configuration parameters (212) with the configuration bundle (122) includes entering (213) the user provided configuration parameters (212) into the configuration bundle retrieved from the vendor's database (604). In one example, entering (213) the user provided configuration parameters (212) into the configuration bundle received from the manufacturer (134) is carried out through a website run by the vendor (102). When a user purchases a client device (120) through the vendor's website, the vendor's website provides screens prompting the user to input user provided configuration parameters. The vendor (102) receives the user provided configuration parameters through the web site and the vendor (102) enters the user provided configuration parameters (212) into the configuration bundle (122). Alternatively, the associated configuration bundle is then downloaded to the user's services gateway, downloaded to a DMS, or stored at the vendor (102).

The method of FIG. 5 includes integrating (758) customized programming (752) with a hook (858). In some examples of the method of FIG. 2a, integrating (758) the customized programming (752) with the configuration bundle includes designing customized programming having the predefined class names and predefined interfaces or interface member methods for the hook that are predetermined by the manufacturer and described in the description (756) of the hook. By designing the customized programming with predefined class names and predefined interfaces or interface member methods received from the manufacturer, calling the hook executes the customized programming.

Figure 6:
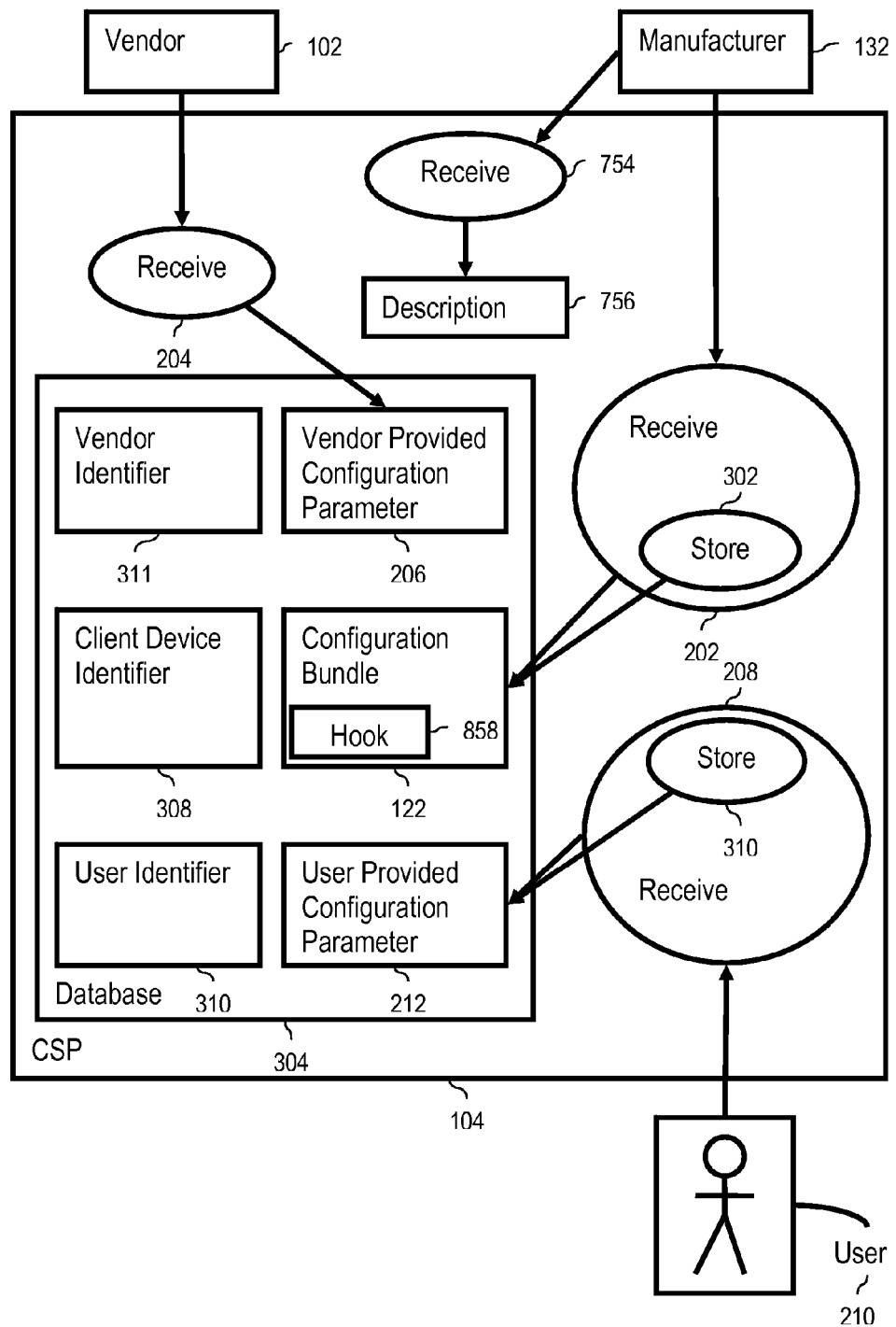
FIG. 6 is a data flow diagram illustrating an exemplary method of receiving, at a configuration services provider, a configuration bundle and user-provided configuration parameters.

FIG. 6 is a data flow diagram illustrating a method of receiving (202), at a configuration services provider (104), a configuration bundle (122) for a client device and receiving (208), at a configuration services provider (104), user-provided configuration parameters (212) for the client device. The method of FIG. 6 includes receiving, (202) from a manufacturer (132), a configuration bundle (122) for a client device (120). The manufacturer (132) is a manufacturer of the configuration bundle (122) for the client device (120). In many exemplary methods for configuring client devices according to embodiments of the present invention, a manufacturer (132) of a configuration bundle (122) is the manufacturer of the client device (120). However, in other examples, the manufacturer (132) of the configuration bundle may not manufacture the client device (120).

In the example of FIG. 6, the configuration bundle (122) includes services and other resources for configuring the client device (120) in accordance with methods of the present invention. In some cases, the configuration bundle (122) may include a driver for the client device (120). In some examples of configuring a client device according to methods of the present invention, the configuration bundle (122) is an OSGi bundle including services for configuring the client device. The OSGi configuration bundle is executed on an OSGi services gateway to configure the client device. Because in many examples of the method of FIG. 6 the configuration bundle (122) is designed to configure a specific client device (120), various configuration bundles (122) have various designs according to the client device the configuration bundle is designed to configure, the network on which the client device (120) will operate, the services gateway to which the configuration bundle (122) will be deployed and executed, or any other factor that will occur to those of skill in the art.

The configuration bundle (122) includes a hook (858). A hook (858) is a call from within a configuration bundle to one or more executable software programs that are not associated with the call when the call is written into the source code for the bundle. The executable programming may not be associated with the call when the call is written for many reasons. For example, the executable programming may be created by a different entity from the manufacturer of the configuration bundle or the executable programming is written after the configuration bundle is created. In many typical embodiments, the hook (858) is a call to a predefined interface or interface methods and a predefined class. A manufacturer of the configuration bundle provides calls to the predefined public member method and predefined class to allow the manufacturer or other entities to integrate customized programming with the configuration bundle such that the customized programming is executed when the hook is called. A manufacturer of the configuration bundle provides hooks to allow the manufacturer or other entities involved in the configuration the flexibility to associate customized programming with the hook at a later time.

In the method of FIG. 6, receiving (202) the configuration bundle (122) for the client device (120) is carried out by a CSP (104). The CSP receives configuration bundles (122) for the client device (120) from the manufacturer (132) for a user (210). A user (210) is typically a subscriber with the CSP (104). When the user (210) purchases or obtains a client device (120) to be configured, the CSP (104) provides the appropriate configuration bundle (122) to the user. A user (210) may request the configuration bundle for the client device from the CSP (104) by calling the CSP, sending the CSP an email, or any other method of requesting the CSP of the new client device to be configured. Alternately, the vendor (102) of the client device (102) notifies the user's CSP (104) of the purchase of the client device (120).

In some examples of the method of FIG. 6, receiving, (202) from a manufacturer (132), a configuration bundle (122) for a client device (120) includes individually downloading the configuration bundle (122) from, for example, a manufacturer's website. Alternatively, receiving, (202) from a manufacturer (132), a configuration bundle (122) for a client device (120) includes receiving configuration bundles as a complete database of configuration bundles indexed, for example, by make, model, or client device serial number. In many cases, the database is stored on a compact disc, or other form of non-volatile computer memory. Receiving, (202) from a manufacturer (132), a configuration bundle (122) for a client device (120) also includes receiving updates to configuration bundles (122) previously received by the CSP (104).

The method of FIG. 6 includes receiving, (204) from a vendor (102), vendor provided configuration parameters (206) for the client device (120). A vendor (102) is a seller, retailer, or provider of the client device (120) to the user. In many examples according to methods of the present invention, the vender provided configuration parameters (206) include a client device identifier. A client identifier sufficiently identifies the client device, such that the appropriate configuration bundle may be received, by for example, a CSP. Examples of client device identifiers are manufacturer's name and manufacturer's model number, a serial number, or any other client device identifier that will occur to those of skill in the art.

In the method of FIG. 6, receiving, (204) from a vendor (102), vendor provided configuration parameters (206) for the client device (120) is carried out by a CSP (104). In one example, a CSP (104) receives vendor provided configuration parameters (206), such as a client identifier identifying the client device (120) purchased by a user (210), from the vendor (102) at the point-of-sale, by receiving an email, telephone call, or any other method of receiving vendor provided configuration parameters (206) that will occur to those of skill in the art.

Consider an example of a vendor (102) operating a website. A user (210) purchases a client device (120) from the vendor (102) through the vendor's website. During the purchase, a vendor's (102) website includes a screen requesting contact information for the user's CSP (104). Upon completion of the purchase, the vendor (102) provides vendor provided configuration parameters (206) to the CSP (104). In this way, the vendor (102) provides vendor provided configuration parameters (206) to the CSP (104) automatically when the user purchases the client device (120).

The method of FIG. 6 includes receiving, (208) from a user (210), user provided configuration parameters (212) for the client device (120). User provided configuration parameters (212) typically include configuration parameters known or available to the user (134) that concern the user's services gateway, network, or other configuration parameters that define context in which the client device (120) will operate. Examples of user provided configuration parameters (212) include a user's LAN mask, a user's IP default gateway address, a user's IP address, a user's LAN name, a user's DMS name, a users link type (Ethernet, Bluetooth, 802.11), wireless network name, wireless encryption key, or any other user provided configuration parameters that will occur to those of skill in the art.

In many examples of methods of configuring a client device according to the present invention, receiving (208) from a user (210), user provided configuration parameters (212) is carried out by a CSP (104). A CSP (104) receives the user provided configuration parameters one time and stores the user provided configuration parameters in a database. The CSP maintains the user provided configuration parameters for the user. When a user (210) subsequently purchases a client device (120), the user provided configuration parameters (212) are available in the CSP's database. Configuration of the client device, therefore, is carried out without requiring additional user provided configuration parameters.

In the method of FIG. 6, receiving (202), from a manufacturer (132), a configuration bundle (132) for a client device includes storing (302) the configuration bundle (132) in a database (304). In the method of FIG. 6, storing (302) the configuration bundle in a database is carried out by a CSP (104). A CSP (104) receives (202) the configuration bundle from the manufacturer (132) and stores the configuration bundles in a database (304. In one example, a CSP receives configuration bundles from many manufacturers regardless the CSP's users. The CSP maintains a current database of all the configuration bundles for all the manufacturers that the service provider supports.

In the database (304) of FIG. 6, the configuration bundles (122) are indexed according to client device identifier (308). Examples of client device identifiers (308) include manufacturer name and model number, serial number or any other client device identifier that will occur to those of skill in the art. By indexing the database (304) by client device identifier (308) the CSP can retrieve the appropriate configuration bundle for the client device to be configured when the CSP is notified of the client device in need of configuration.

In the method of FIG. 6, receiving (208), from a user (210), user provided configuration parameters (212) for the client device includes storing (310) the configuration parameters (212) in a database (304). In many examples of the method of the present invention, storing (310) the configuration parameters (212) in a database (304) is carried out by a CSP. The CSP receives configuration parameters from a user of the configuration services. The CSP receives the user provided configuration parameters one time and stores the user provided configuration parameters.

By storing (310) user provided configuration parameters (212), the CSP automates the configuration for a user reducing the user's involvement in configuration with each additional client device (120) on the user's gateway. Upon receipt of the vendor provided configuration parameters, for example, a client device identifier, the CSP can retrieve the appropriate configuration bundle and the user provided configuration parameters without further user intervention.

In the method of FIG. 6, receiving (754) a description (756) of the hook is carried out by the CSP. In some examples of the method of FIG. 6, a description (756) of the hook includes predefined interfaces or interface member methods and predefined class names for the hook, such that customized programming (752) can be integrated with the configuration bundle through the hook (858) so that calling the associated hook executes the customized programming. In some examples of the method of FIG. 6, the description (756) of the hook is included within a specification produced for each configuration bundle (122) manufactured by the manufacturer. A vendor interested in associating (750) customized programming (752) with the hook (858) receives the predefined interfaces or interface member methods and predefined class names for the hook and designs customized programming to be executed when the hook is called.

Figure 7:
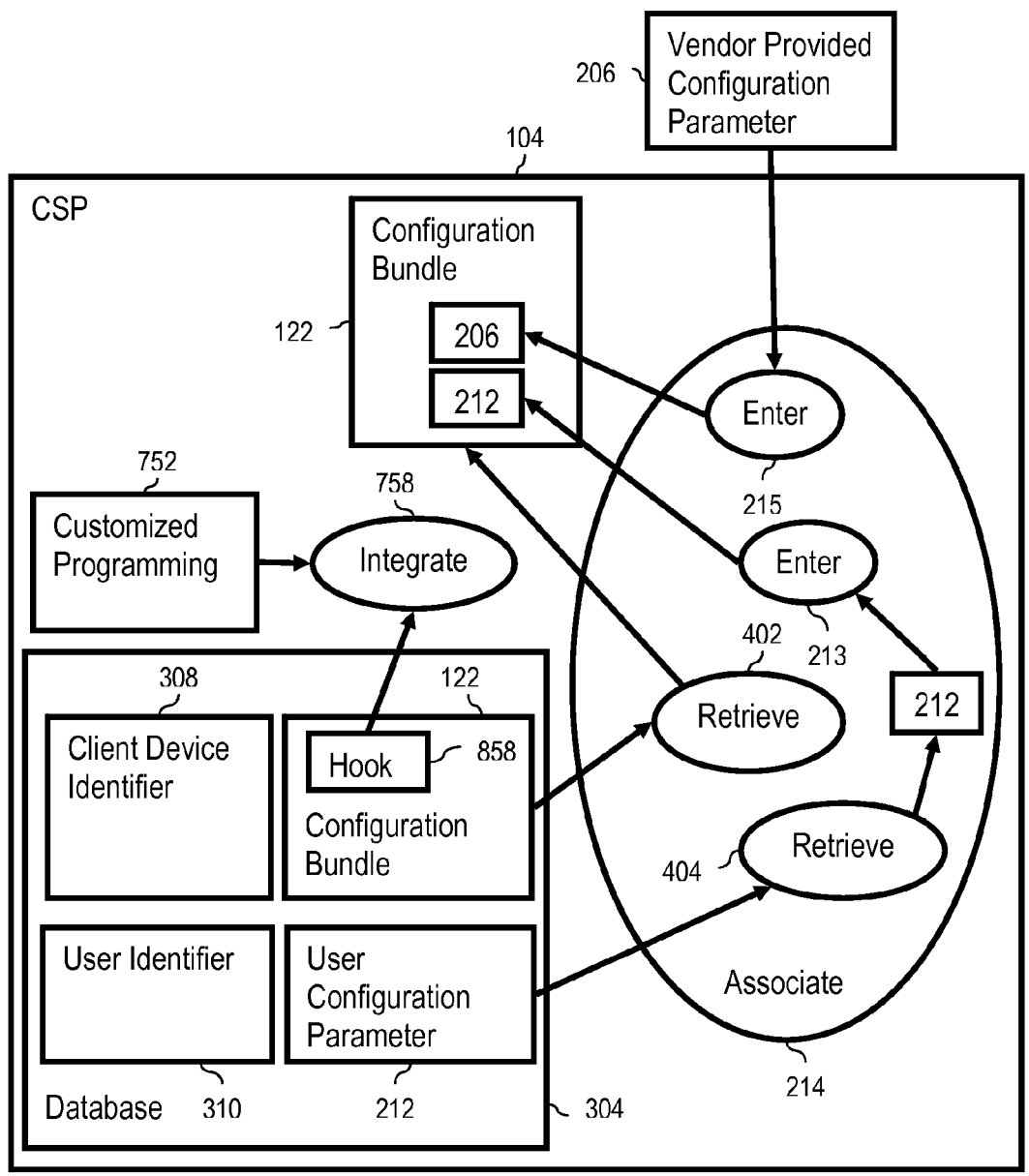
FIG. 7 is a data flow diagram illustrating an exemplary method of associating, at a configuration services provider, a configuration bundle with user-provided configuration parameters.

FIG. 7 is a data flow diagram illustrating a method of associating (214) the user-provided configuration parameters (212) with the configuration bundle (122). The method of FIG. 7 includes associating (214) the vendor provided configuration parameters (206) and the user provided configuration parameters (212) with the configuration bundle (122) for the client device (120). Associating (214) the vendor provided configuration parameters (206) and the user provided configuration parameters (212) results in an associated configuration bundle. An associated configuration bundle is a configuration bundle having the appropriate configuration parameters such that when deployed to the user's services gateway, and when executed, the associated configuration bundle configures the client device.

When the user provided configuration parameters (212) and the vendor provided configuration parameters have been associated with the configuration bundle, the associated configuration bundle is ready for deployment to the user's services gateway. In many cases, more than one configuration bundle are associated to create a complete set of associated configuration bundles, such that when the set of configuration bundles are deployed onto the user's services gateway and executed, the user's client device is configured.

In the method of FIG. 7, associating (214) the vendor provided configuration parameters (206) and the user provided configuration parameters (212) with the configuration bundle (122) for the client device (120) is carried out by a CSP. In some examples, the CSP receives a notification that the user (210) has purchased or otherwise obtained a client device (120). The CSP receives the vendor provided configuration parameters (206), such as a client device identifier. The CSP receives the appropriate configuration bundle (122) for the client device (120) from a manufacturer. The CSP may then retrieve the user provided configuration parameters (212) from a database maintained by the CSP. The CSP then associates the vendor provided configuration parameters (206) and the user provided configuration parameters (212) with the configuration bundle (122) for the client device (120).

In the method of FIG. 7, associating (214) the vendor provided configuration parameters (206) and the user provided configuration parameters (206) with the configuration bundle (122) for the client device (120) includes retrieving (402) the configuration bundle (122) from a database (304) in dependence upon a client device identifier (308) and retrieving (404) the user configuration parameters (212) from a database (304) in dependence upon a user identifier (310).

In the method of FIG. 7, associating (214) the vendor provided configuration parameters (206) and the user provided configuration parameters (212) with the configuration bundle (122) includes entering (213) the user provided configuration parameters (212) into the configuration bundle received from the manufacturer (134). Associating (214) the vendor provided configuration parameters (206) and the user provided configuration parameters (212) with the configuration bundle (122) also includes entering (215) and vendor provided configuration parameters (206) into the configuration bundle (122) received from the manufacturer (132).

In method of FIG. 7, associating (214) the vendor provided configuration parameters (206) and the user provided configuration parameters (212) with the configuration bundle (122) is carried out by a CSP (104). In one example, entering (213) the user provided configuration parameters (212) into the configuration bundle received from the manufacturer (134) and entering (215) and vendor provided configuration parameters (206) into the configuration bundle (122) received from the manufacturer (132) is carried out through a website run by the CSP (104). Upon purchasing a client device (120) a vendor logs onto the CSP's website. The vendor (102) provides the vendor provided configuration parameters (206) through the web site and the CSP (104) enters the vendor provided configuration parameters (206) into the configuration bundle (122) for the client device (120). The vendor (102) also identifies the user, by userID, name, or any other user identifier (310). The CSP (104) retrieves the user provided configuration parameters (212) stored in a database indexed by userID, name, or any other user identifier and enters the user provided configuration parameters (212) into the configuration bundle (122) for the client device (120).

If the CSP (104) has not received the user provided configuration parameters (212) from the user (210), the CSP can receive the user provided configuration parameters (212) from the user through the CSP's website. The CSP (104) receives the user provided configuration parameters (212) through the website, and enters the user provided configuration parameters (212) into the configuration bundle (122) for the client device (120).

In another example of the method of FIG. 7 includes integrating (758) customized programming (752) with a hook (858). In some examples of the method of FIG. 2a, integrating (758) the customized programming (752) with the configuration bundle includes designing the customized programming having the predefined class names and predefined interfaces or interface member methods for the hook that are predetermined by the manufacturer and described in the description (756) of the hook. By designing the customized programming with predefined class names and predefined interfaces or interface member methods received from the manufacturer, calling the hook executes the customized programming.

Figure 8:
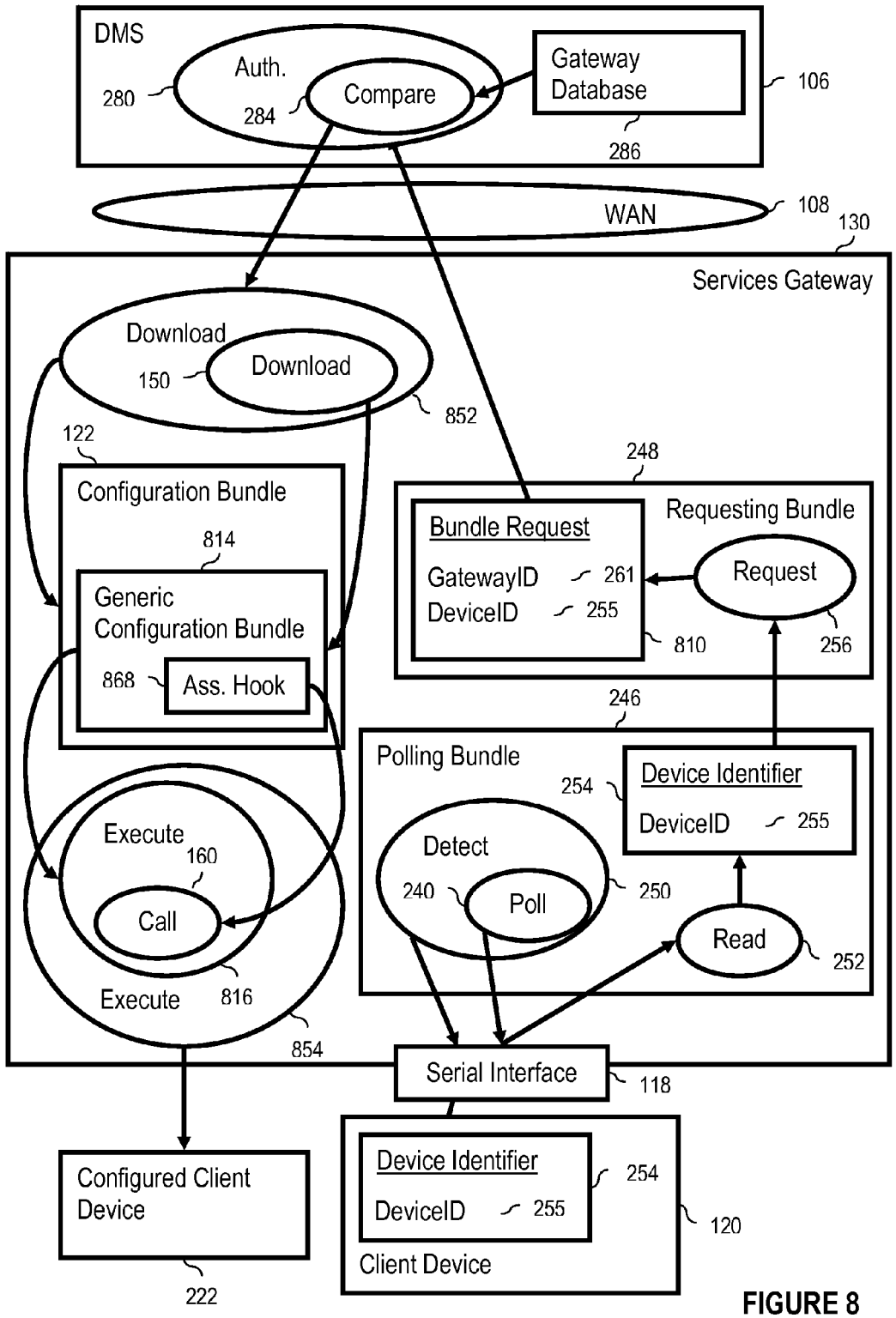
FIG. 8 is a data flow diagram illustrating an exemplary method of downloading a generic configuration and executing the generic configuration bundle.

FIG. 8 is a data flow diagram illustrating a method of downloading a generic configuration bundle to configure a client device in accordance with methods of configuring a client device according to the present invention. In the method of FIG. 8, downloading (852) a configuration bundle (122) for a client device (120) to a services gateway includes downloading (150) a generic configuration bundle (814) to a services gateway.

The method of FIG. 8 includes detecting (250) the client device (120). In the method of FIG. 8, detecting (250) a client device (120) includes polling (240) a serial interface (118) of a services gateway (130) for the connection of a client device (120) to the services gateway (130). Polling (240) a serial interface (118) means periodically checking the serial interface for the connection of a client device.

In the method of FIG. 8, detecting (250) the client device (250) is carried out through a polling bundle (246). In some example embodiments, the polling bundle (246) is an OSGi bundle. An OSGi framework provides standard services in the DAS for checking for the connection of devices on the services gateway (130). In some examples, the polling bundle (246) includes specifically programmed polling services within the bundle. In alternative examples, the polling bundle (246) queries a services registry on an OSGi framework operating on the services gateway to identify standard OSGi services for checking for the connection of a device on the services gateway.

The method of FIG. 8 includes reading (252) a client device identifier (254) from the client device (120). A client device identifier (254) is any identification that sufficiently identifies the client device. Exemplary client device identifiers include manufacturer name, model name, serial number, or any other client device identifier as will occur to those of skill in the art.

The client device identifier may be represented in data by a record such as the client device identifier record (254) of FIG. 8. The client device identifier record (254) is stored in non-volatile memory on the client device (120). The client device identifier record (254) includes a deviceID field (255) representing a serial number, make and model, or any other identification of the device that will occur to those of skill in the art.

In method of FIG. 8, a polling bundle (246) carries out reading (252) a client device identifier (254) from the client device (120). In some example embodiments, the polling bundle (246) is an OSGi bundle. An OSGi framework provides standard services in a DAS for reading device identifiers from a device connected to the services gateway. In some examples according to the method of FIG. 8, a polling bundle (246) includes specifically programmed services within the bundle to read the client device identifier. In alternative examples, the polling bundle (246) queries a services registry on an OSGi framework operating on the services gateway to identify standard OSGi services for reading a client device identifier. In such embodiments, the polling bundle (246) then uses the OSGi standard services to read a client device identifier from the client device.

A DAS in an OSGi framework often also provides standard services to identify and install a driver for the client device. In embodiments that utilize such DAS services, when a polling bundle (246) detects a client device (120) and reads the client device identifier, the polling bundle queries the service registry on the service framework of the services gateway to identify standard services to obtain and install a driver to facilitate communication between the services gateway and the client device.

The method of FIG. 8 includes requesting (256) a configuration bundle for the client device (120) in dependence upon the client device identifier (254). The configuration bundle (122) includes services and other resources for configuring the client device (120) in accordance with methods of the present invention. In some cases, the configuration bundle (122) may include a driver for the client device (120). In some examples of configuring a client device according to methods of the present invention, the configuration bundle (122) is an OSGi bundle including services for configuring the client device. The OSGi configuration bundle is executed on an OSGi services gateway to configure the client device. Because the configuration bundle (122) is designed to configure a specific client device (120), in many examples, various configuration bundles (122) have various designs according to the client device the configuration bundle is designed to configure, the network on which the client device (120) will operate, the services gateway to which the configuration bundle (122) will be deployed and executed, or any other factor that will occur to those of skill in the art.

In some examples of the present invention, requesting (256) a configuration bundle for the client device includes requesting an associated configuration bundle. An associated configuration bundle is a configuration bundle with user-provided configuration parameters contained within the bundle, such that when executed on the user's services gateway, the associated configuration bundle configures the client device without requiring the user to enter configuration parameters. Examples of user-provided configuration parameters (212) include a user's LAN mask, a user's IP default gateway address, a user's IP address, a user's LAN name, a user's DMS name, a users link type (Ethernet, Bluetooth, 802.11), wireless network name, wireless encryption key, or any other user-provided configuration parameters that will occur to those of skill in the art.

In the method of FIG. 8, requesting (256) a configuration bundle for the client device includes requesting the configuration bundle for the client device from a DMS. The DMS is a server specifically designed to provide bundles to the services gateway (130). Alternatively, requesting (256) a configuration bundle for the client device includes requesting an associated configuration bundle from a vendor, manufacturer, or CSP.

A request for a configuration bundle is represented in a data as a record such as the bundle request record (810) of FIG. 8. The bundle request record (810) includes a deviceID field (255) identifying the client device to be configured. The bundle request record (810) also includes a gatewayID field (261) identifying the gateway requesting the associated configuration bundle. In some examples, the gatewayID and the DeviceID together uniquely identify the configuration bundle for the device. In other example, the bundle request record includes a userID identifying the user.

Requesting a configuration, in many embodiments of the present invention, is carried out by a requesting bundle, such as the requesting bundle (242) of FIG. 8. In some exemplary embodiments according to the present invention, the requesting bundle (242) is an OSGi bundle including services capable of sending a request for an associated configuration bundle to a DMS. The OSGi framework provides a standard HTTP service. In some examples, a requesting bundle (242) sends a bundle request to the DMS as a HTML document in an HTTP message.

The method of FIG. 8 includes authenticating (280) the services gateway (130). Authenticating the gateway can be carried out, for example, by comparing (284) the gatewayID field (261) of the bundle request record (810) with a gateway database (286). In the method of FIG. 8, authenticating (280) the services gateway (130) is carried out by a DMS. The DMS authenticates the services gateway by comparing the services gatewayID (261) with a database of gateway identifiers registered with the DMS. When the services gateway is authenticated, the DMS attempts to identify an associated configuration bundle for the client device stored on the DMS, or attempts to retrieve an associated configuration bundle from a CSP or vendor.

The method of FIG. 8 includes downloading (150) a generic configuration bundle (814). A generic configuration bundle (814) is a configuration bundle for carrying out methods of configuring a client device in accordance with the present invention when a configuration bundle specific to the client device is not available either because the configuration bundle does not exist, or the services gateway does not have access to the associated configuration bundle through a DMS, CSP, vendor, or manufacturer. The generic configuration bundle (814) includes services and other resources to facilitate the user's entry of user-provided configuration parameters to configure the client device (120).

The method of FIG. 8 executing (854) the configuration bundle (122) includes executing (816) the generic configuration bundle (814). In many cases, the generic configuration bundle (814) is executed when the client device (120) is detected on the services gateway (130). In other examples, executing (816) the generic configuration bundle (814) includes receiving an instruction from the user to execute the generic configuration bundle (814). Using a web browser installed on a computer connected to the services gateway, a user can through a series of instruction screens instruct the services gateway to execute the generic configuration bundle. In many embodiments, a services gateway according to the present invention has installed directly upon it no user interface hardware, no terminal screen, no keyboard, no mouse, although such services gateways do often support HTTP interfaces to services on the gateway. In such embodiments, a user can access HTTP screens on the gateway by logging on to a browser on a personal computer or other client device that does support user interface hardware and is coupled to the gateway through a LAN and directing the browser to the services gateway's IP address on the LAN.

In the method of FIG. 8, executing (816) the configuration bundle (122) includes calling (160) the associated hook (858). Calling (160) the associated hook (858), executes the customized programming (752). In many examples of the method of FIG. 8, calling (160) the associated hook (860) includes calling predefined interfaces or interface member methods and a predefined class. If no customized programming is associated with the hook, then calling these predefined interfaces or interface member methods and predefined classes does nothing. If no customized programming is associated with the hook, the hook is called, no customized programming is executed, and configuration of the client device proceeds without interruption.

Figure 9:
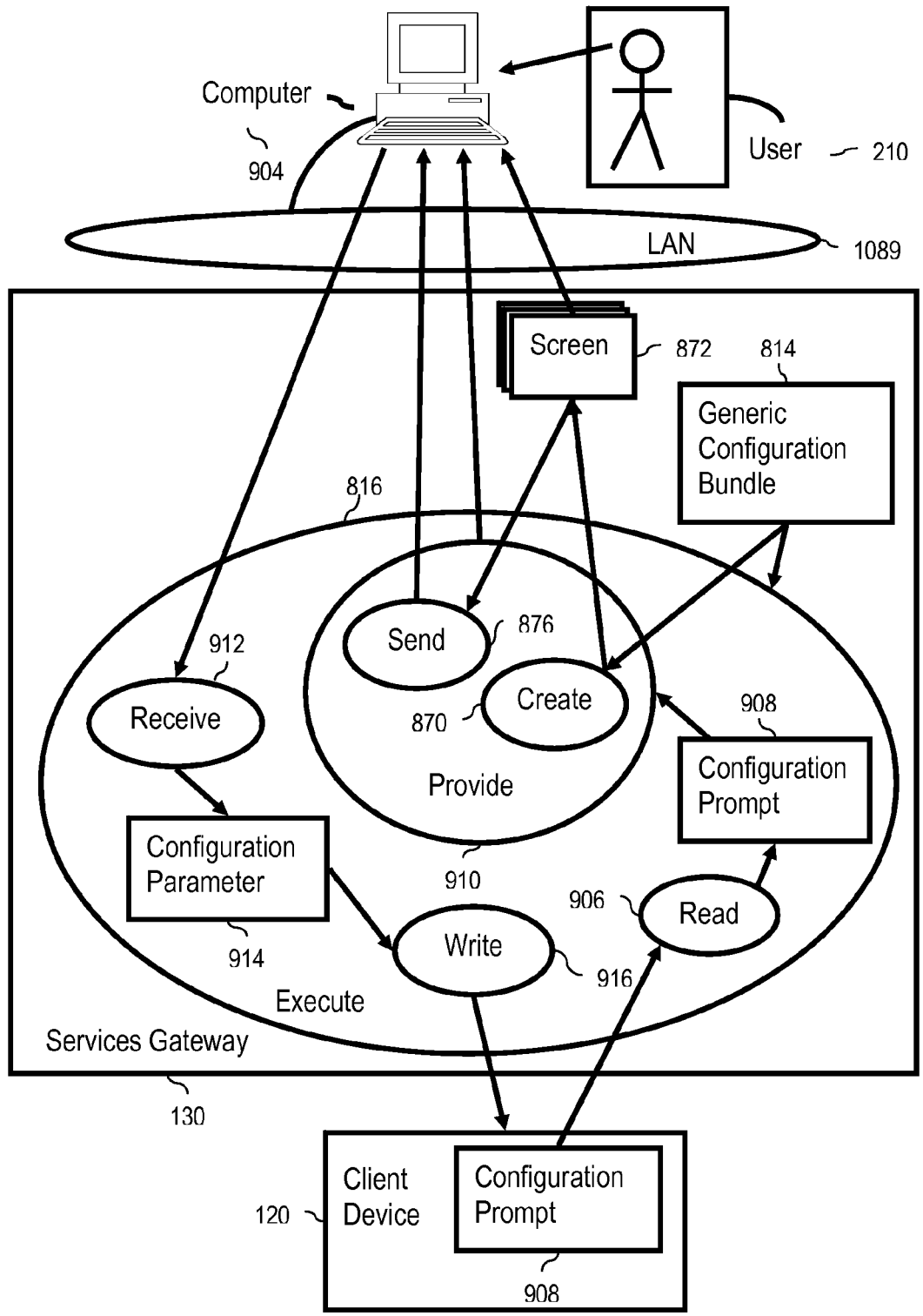
FIG. 9 is a data flow diagram illustrating an exemplary method of executing a generic configuration bundle.

FIG. 9 is a data flow diagram illustrating an exemplary method of executing (816) a generic configuration bundle (814). In the method of FIG. 9 executing (816) a generic configuration bundle (814) includes reading (906) a configuration prompt (908) from a client device (120). In method of FIG. 9, a configuration prompt (908) is stored in non-volatile memory on the client device (120). The configuration prompt (908) includes prompting text for display to a user that identifies the user-provided configuration parameters necessary to configure the client device. Examples of user-provided configuration parameters include a user's LAN mask, a user's IP default gateway address, a user's IP address, a user's LAN name, a user's DMS name, a users link type (Ethernet, Bluetooth, 802.11), wireless network name, wireless encryption key, or any other user-provided configuration parameters that will occur to those of skill in the art.

In some examples of the method of FIG. 9, reading (906) a configuration prompt (908) from a client device (120) is carried out by services in an OSGi framework called by the generic configuration bundle (814). The generic configuration bundle may call services from within the generic configuration bundle that are programmed specifically to read the configuration prompt from the client device. In alternative examples of the method of FIG. 9, the generic configuration bundle queries a services registry on the framework to locate a service or set of services capable of reading the configuration prompt from the client device.

The method of FIG. 9 includes providing (910) the configuration prompt (908) to a user (210). In some embodiments, providing the configuration prompt to the user is carried out by providing the prompt in text at a command line prompt such as the one provided by the command "cmd.exe" in modern versions of Microsoft Windows or any other text based prompt that will occur to those of skill in the art. In many embodiments, a services gateway according to the present invention has installed directly upon it no user interface hardware, such as a terminal screen, keyboard, or mouse. In such embodiments, providing the prompt to a user includes communicating the prompt across a LAN to another client device such as a personal computer or workstation having connected to it user interface hardware such as a terminal screen, keyboard, mouse, and so on. That is, in many example embodiments of the method of FIG. 9, providing (910) the configuration prompt (908) to a user includes writing the configuration prompt (908) to a terminal screen on a computer (904) connected to the services gateway (130) across a LAN (109).

In many examples of the method of FIG. 9, configuration prompts (908) stored on the client device (120) are text only prompts. As text only, the configuration prompts (908) are, in many cases, unfriendly or complicated to users unfamiliar with configuring the client device (120). In the method of FIG. 9, providing (910) the configuration prompt (908) to a user includes creating (870) a configuration screen (872) for the configuration prompt (908) read from the client device (120). The configuration screen (872) of the method of FIG. 9 is a user-friendly GUI data entry screen designed to facilitate the user's entry of user-provided configuration parameters. In many examples of the method of FIG. 9, multiple configuration screens (872) are created to walk the user through the configuration process. In some examples of the method of FIG. 9, creating (972) the configuration screens (872) includes creating the configuration screen as an HTML document and sending (876) the configuration prompt (908) to the user as an HTML document in an HTTP message.

In many embodiments where the services gateway has no user interface hardware, the services gateway does support HTTP. In such embodiments, a user can access the HTML configuration screens (872) sent to the user as HTTP messages by logging on to a browser on a personal computer (904) as or other client device that does support user interface hardware and is coupled to the services gateway through a LAN and directing the browser to the services gateway's IP address on the LAN.

In some examples of the method of FIG. 9, creating (870) the configuration screens is carried out by OSGi services contained within the generic configuration bundle (814). In alternative examples, the generic configuration bundle (814) queries a services registry on the framework to identify services useful in creating configuration screens (872).

The method of FIG. 9 also includes receiving (912) configuration parameters (914) from a user (210). In the method of FIG. 9, receiving (912) configuration parameters (914) from a user (210) comprises receiving an HTML document in an HTTP message. Using a web browser installed on a computer connected through a LAN to the services gateway, a user accesses the configuration screen (872) provided to the user and enters the user-provided configuration parameters. Examples of user-provided configuration parameters include a user's LAN mask, a user's IP default gateway address, a user's IP address, a user's LAN name, a user's DMS name, a users link type (Ethernet, Bluetooth, 802.11), wireless network name, wireless encryption key, or any other user-provided configuration parameters that will occur to those of skill in the art.

The method of FIG. 9 includes writing (916) the configuration parameters (914) to the client device (120). In some examples of the method of FIG. 9, writing (916) the configuration parameters to the client device is carried out by services in an OSGi framework. That is, in such embodiments, the generic configuration bundle can query a services registry in an OSGi framework to identify a service or set of services capable of writing the user-provided configuration parameters to the client device.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for configuring a client device, the method comprising the steps of:
    associating a hook in a configuration bundle with customized programming;
        wherein the hook is a call from within the configuration bundle to one or more executable software programs that are not associated with a call to the configuration bundle;
        wherein associating a hook in a configuration bundle with customized programming comprises:
            receiving a description of the hook from a manufacturer;
            integrating the customized programming with the configuration bundle through the hook in dependence upon the description;
    downloading the configuration bundle for a client device to a services gateway, including downloading a generic configuration bundle to the services gateway,
        wherein the services gateway provides vendor neutral application and device layer application programming interfaces and functions; and
    executing the configuration bundle on the services gateway, including calling the hook, further comprising:
        executing the generic configuration bundle, including:
            reading a configuration prompt from the client device;
            providing the configuration prompt to a user;
            receiving configuration parameters from the user; and
            writing the configuration parameters to the client device.

2. The method of claim 1, comprising detecting a client device and requesting a configuration bundle for the client device.

3. The method of claim 1, further comprising receiving, at a vendor, the configuration bundle for a client device.

4. The method of claim 3, further comprising receiving, at a vendor, user-provided configuration parameters for the client device.

5. The method of claim 4, comprises associating the user-provided configuration parameters with the configuration bundle.

6. The method of claim 1, further comprising receiving, at a configuration services provider, a configuration bundle for a client device.

7. The method of claim 6, further comprising receiving, at a configuration services provider, user-provided configuration parameters for the client device.

8. The method of claim 7, comprising associating the user-provided configuration parameters with the configuration bundle.

9. A system for configuring a client device, the system comprising:
a computer processor and a computer memory operatively coupled to the computer processor, the computer memory having disposed within it computer program instructions for:
associating a hook in a configuration bundle with customized programming;
wherein the hook is a call from within the configuration bundle to one or more executable software programs that are not associated with a call to the configuration bundle;
wherein associating a hook in a configuration bundle with customized programming comprises:
receiving a description of the hook from a manufacturer;
integrating the customized programming with the configuration bundle through the hook in dependence upon the description;
downloading the configuration bundle for a client device to a services gateway, including downloading a generic configuration bundle to the services gateway,
wherein the services gateway provides vendor neutral application and device layer application programming interfaces and functions; and
executing the configuration bundle on the services gateway, including calling the hook, further comprising:
executing the generic configuration bundle, including:
reading a configuration prompt from the client device;
providing the configuration prompt to a user;
receiving configuration parameters from the user; and
writing the configuration parameters to the client device.

10. The system of claim 9, wherein the computer memory also has disposed within it computer program instructions for detecting a client device and
computer program instructions for requesting a configuration bundle for the client device.

11. The system of claim 9, wherein the computer memory also has disposed within it computer program instructions for receiving, at a vendor, the configuration bundle for a client device.

12. The system of claim 11, wherein the computer memory also has disposed within it computer program instructions for receiving, at a vendor, user-provided configuration parameters for the client device.

13. The system of claim 12, wherein the computer memory also has disposed within it computer program instructions for associating the user-provided configuration parameters with the configuration bundle.

14. The system of claim 9, wherein the computer memory also has disposed within it computer program instructions for receiving, at a configuration services provider, a configuration bundle for a client device.

15. The system of claim 14, wherein the computer memory also has disposed within it computer program instructions for receiving, at a configuration services provider, user-provided configuration parameters for the client device.

16. The system of claim 15, wherein the computer memory also has disposed within it computer program instructions for associating the user-provided configuration parameters with the configuration bundle.

17. A computer program product for configuring a client device, the computer program product disposed upon a non-transitory computer readable storage medium, the computer program product comprising:
computer program instructions for associating a hook in a configuration bundle with customized programming;
wherein the hook is a call from within the configuration bundle to one or more executable software programs that are not associated with a call to the configuration bundle;
wherein associating a hook in a configuration bundle with customized programming comprises:
computer program instructions for receiving a description of the hook from a manufacturer;
computer program instructions for integrating the customized programming with the configuration bundle through the hook in dependence upon the description;
computer program instructions for downloading the configuration bundle for a client device to a services gateway, including downloading a generic configuration bundle to the services gateway,
wherein the services gateway provides vendor neutral application and device layer application programming interfaces and functions; and
computer program instructions for executing the configuration bundle on the services gateway, including calling the hook, further comprising:
computer program instructions for executing the generic configuration bundle, including:
computer program instructions for reading a configuration prompt from the client device;
computer program instructions for providing the configuration prompt to a user;
computer program instructions for receiving configuration parameters from the user; and
computer program instructions for writing the configuration parameters to the client device.

18. The computer program product of claim 17, comprising computer program instructions for detecting a client device and requesting a configuration bundle for the client device.

19. The computer program product of claim 17, further comprising computer program instructions for receiving, at a vendor, the configuration bundle for a client device.

20. The computer program product of claim 19, further comprising computer program instructions for receiving, at a vendor, user-provided configuration parameters for the client device.

21. The computer program product of claim 20, comprises computer program instructions for associating the user-provided configuration parameters with the configuration bundle.

22. The computer program product of claim 17, further comprising computer program instructions for receiving, at a configuration services provider, a configuration bundle for a client device.

23. The computer program product of claim 22, further comprising computer program instructions for receiving, at a configuration services provider, user-provided configuration parameters for the client device.

24. The computer program product of claim 23, comprising computer program instructions for associating the user-provided configuration parameters with the configuration bundle.

* * * * *